United States Patent
Garabet

(10) Patent No.: US 12,019,234 B1
(45) Date of Patent: Jun. 25, 2024

(54) RING-SHAPED VISUAL AID

(71) Applicant: Antoine Leon Garabet, Glendora, CA (US)

(72) Inventor: Antoine Leon Garabet, Glendora, CA (US)

(*) Notice: Subject to any disclaimer, the term of this patent is extended or adjusted under 35 U.S.C. 154(b) by 432 days.

(21) Appl. No.: 17/397,573

(22) Filed: Aug. 9, 2021

Related U.S. Application Data

(63) Continuation-in-part of application No. 16/252,626, filed on Jan. 19, 2019, now Pat. No. 11,112,596.

(60) Provisional application No. 63/077,582, filed on Sep. 12, 2020.

(51) Int. Cl.
G02B 25/00 (2006.01)
A44C 9/00 (2006.01)
G02B 7/00 (2021.01)
G02B 7/02 (2021.01)

(52) U.S. Cl.
CPC .......... *G02B 25/008* (2013.01); *A44C 9/0053* (2013.01); *G02B 7/002* (2013.01); *G02B 7/02* (2013.01)

(58) Field of Classification Search
CPC ............................ G02B 25/002; G02B 25/005
See application file for complete search history.

(56) References Cited

U.S. PATENT DOCUMENTS

| 1,668,283 A | 1/1928 | O'Meara |
| 4,133,603 A | 1/1979 | Inouye et al. |
| 2007/0115427 A1* | 5/2007 | Sauer ............... G02B 7/002 351/56 |

FOREIGN PATENT DOCUMENTS

| CN | 2357342 Y | 1/2000 |
| CN | 201831172 U | 5/2011 |
| CN | 201320080140 | 2/2013 |
| DE | 202007008693 U1 | 8/2007 |
| FR | 529738 | 12/1921 |
| JP | 2000235801 A | 8/2000 |
| JP | 2004219533 | 8/2004 |
| JP | 2006215414 A | 8/2006 |
| JP | 2016071064 A | 5/2016 |
| KR | 20150001051 U | 9/2013 |

* cited by examiner

*Primary Examiner* — Joseph P Martinez
(74) *Attorney, Agent, or Firm* — Lewis M Brande; Law Office of Lewis Brande

(57) ABSTRACT

The device of the current invention is a ring-shaped optical visual aid consisting of a handle that carries one or more lenses. Such lens or lenses are attached along the circumference of the ring handle. The optical axis of the lens or lenses is located in or near the geometric plane that contains the main plain of the ring. As such the lens or lenses can be placed anywhere around the ring to perform in a synergistic fashion to optimize visual utility. When only one lens is placed on the ring, the shape of such ring can also be manipulated to allow for optimal use through alterations to structural details of that ring. Unlike most existing visual aids, the ring-shaped handle described in the current invention can be conveniently worn on a finger indefinitely.

11 Claims, 39 Drawing Sheets

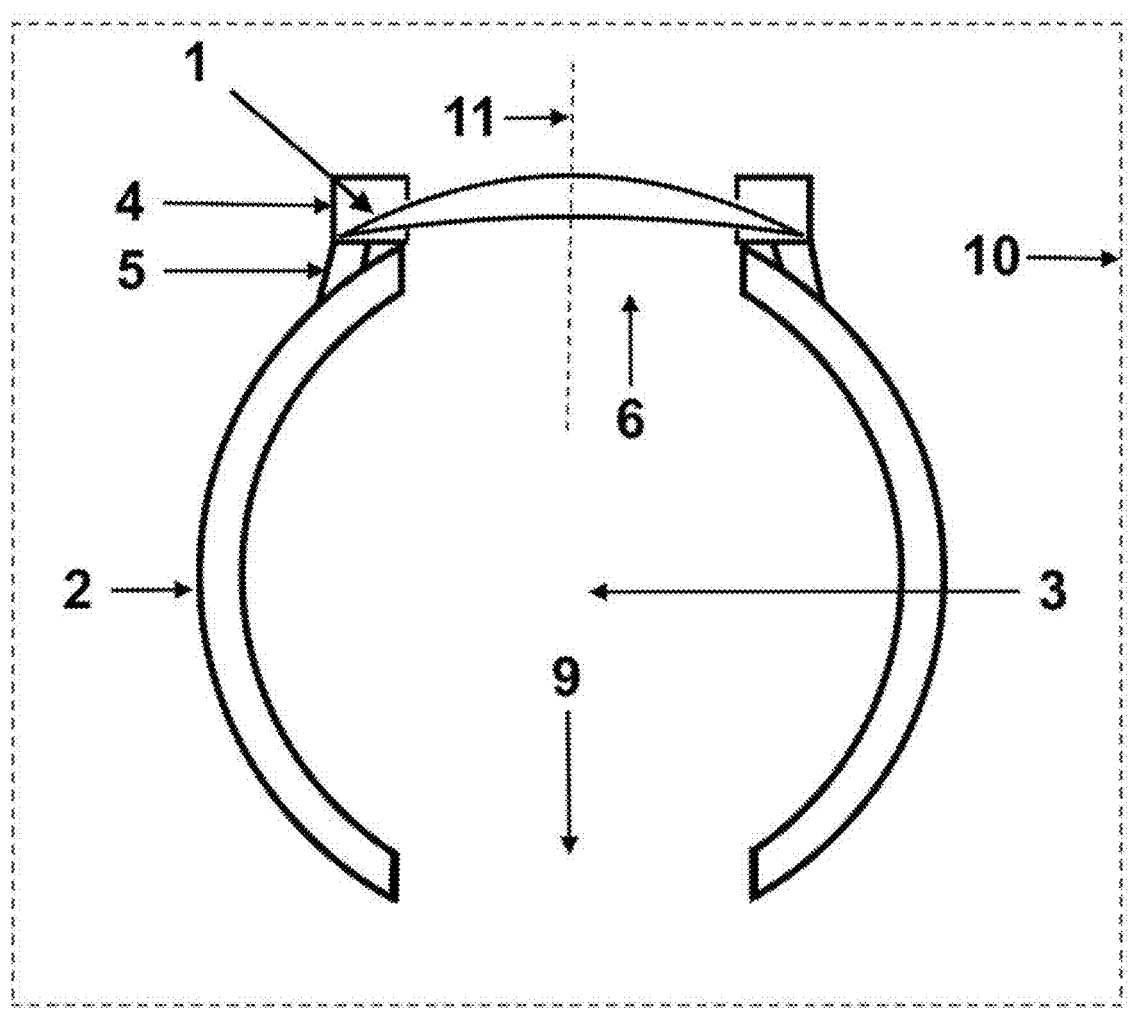

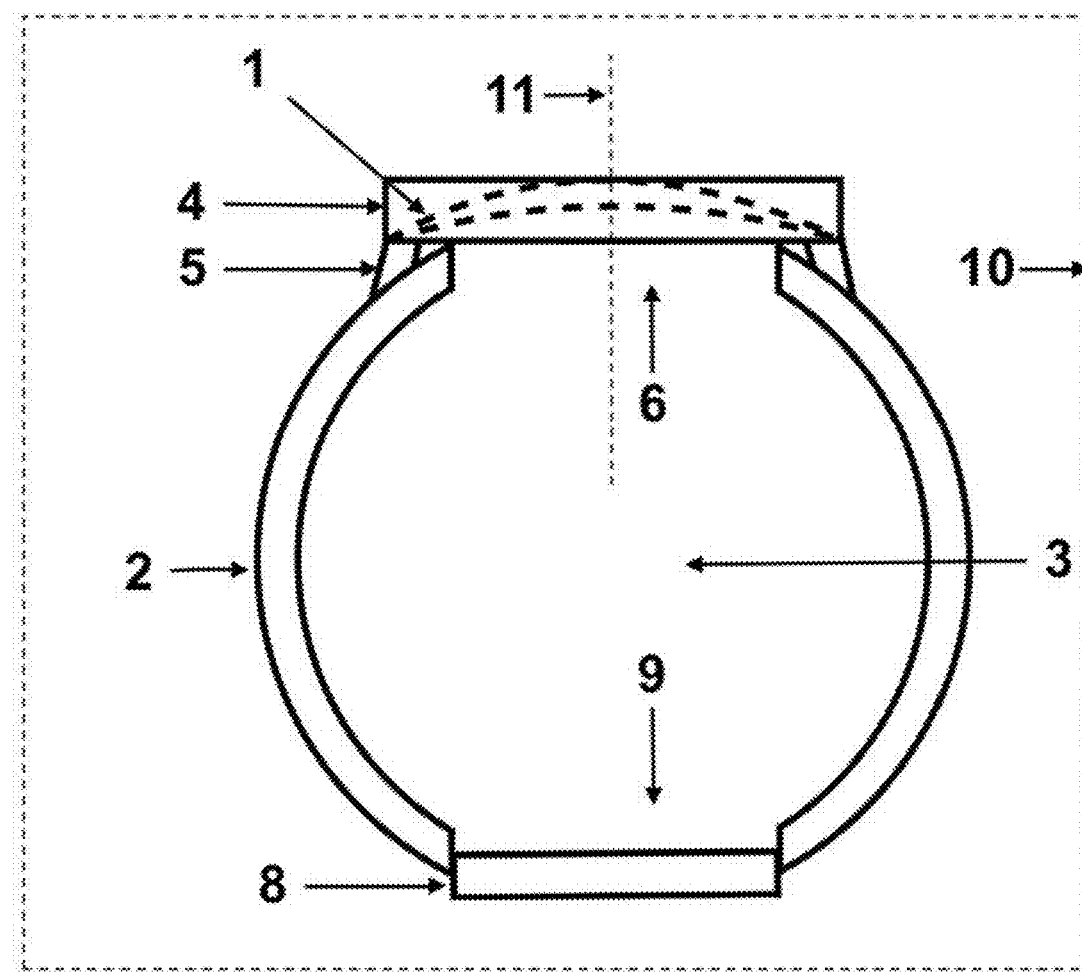
Figure 1.1- Side View of Ring With 1 Lens

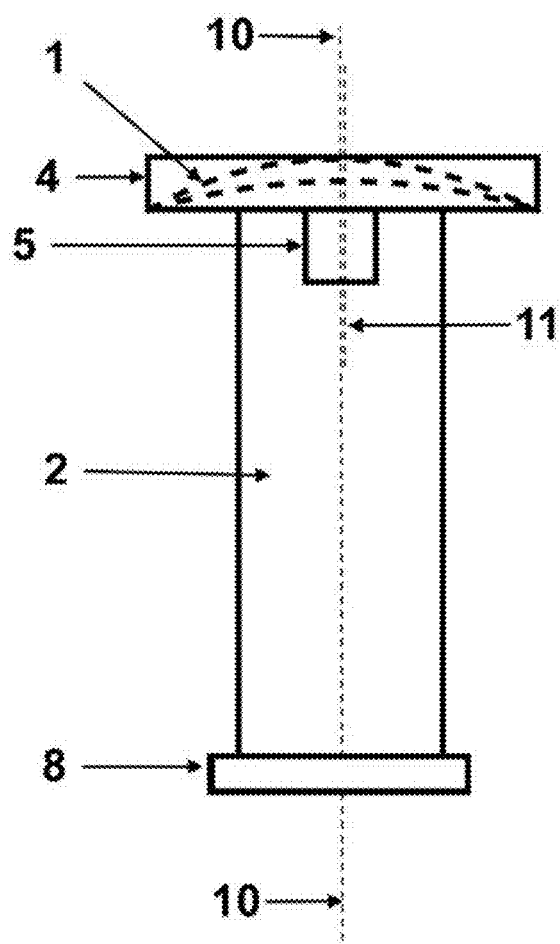
Figure 1.2 - Profile View of the Ring with 1 Lens

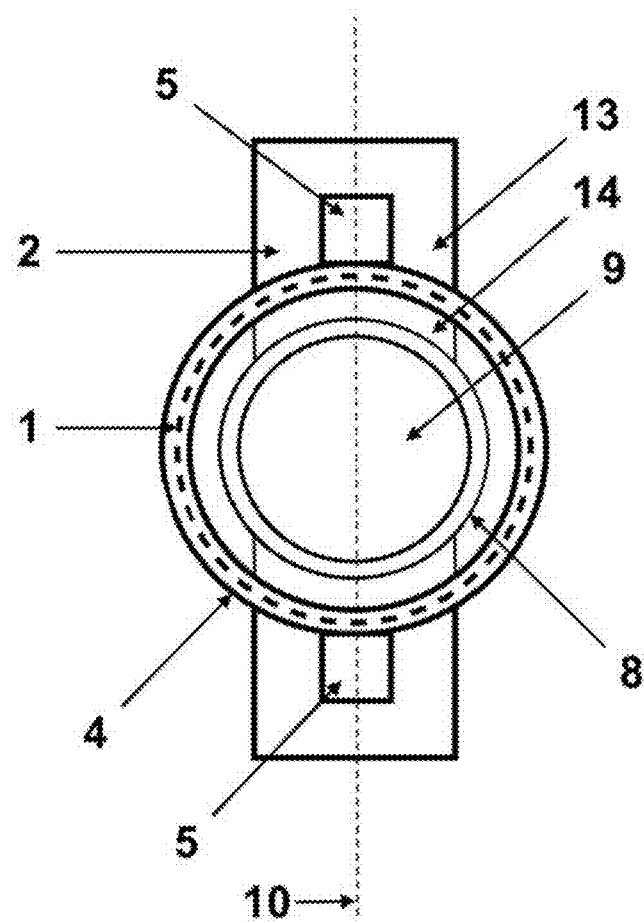
Figure 1.3- Top View of the Ring with 1 Lens

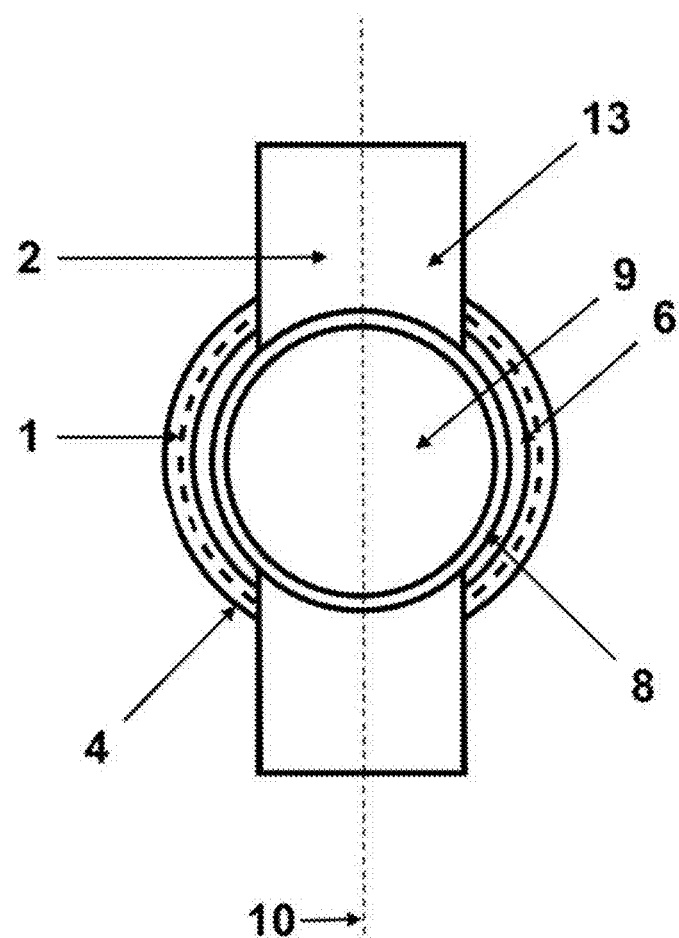
Figure 1.4-Bottom View of the Ring with 1 Lens

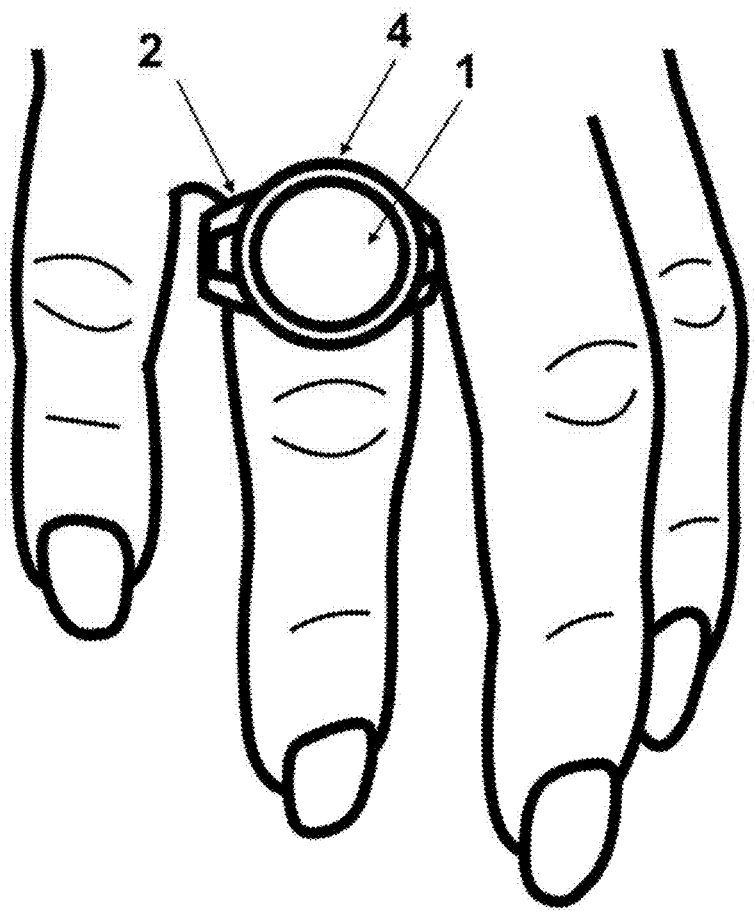
Figure 1.5- One Lens Worn as Fashion Item

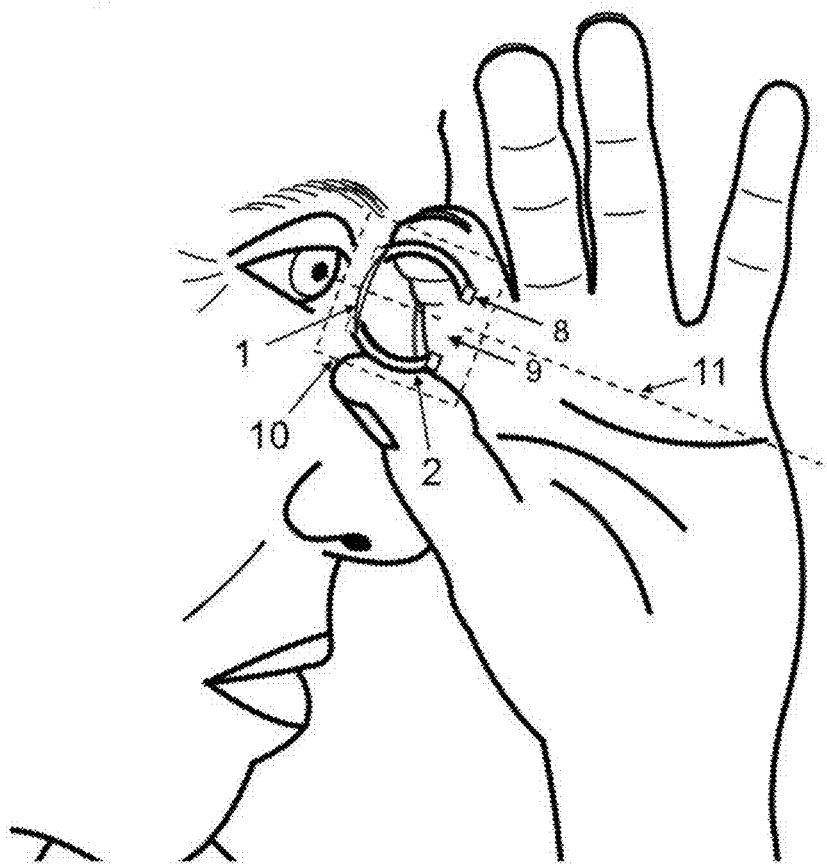
Figure 1.6- Two Lens Ring in Use

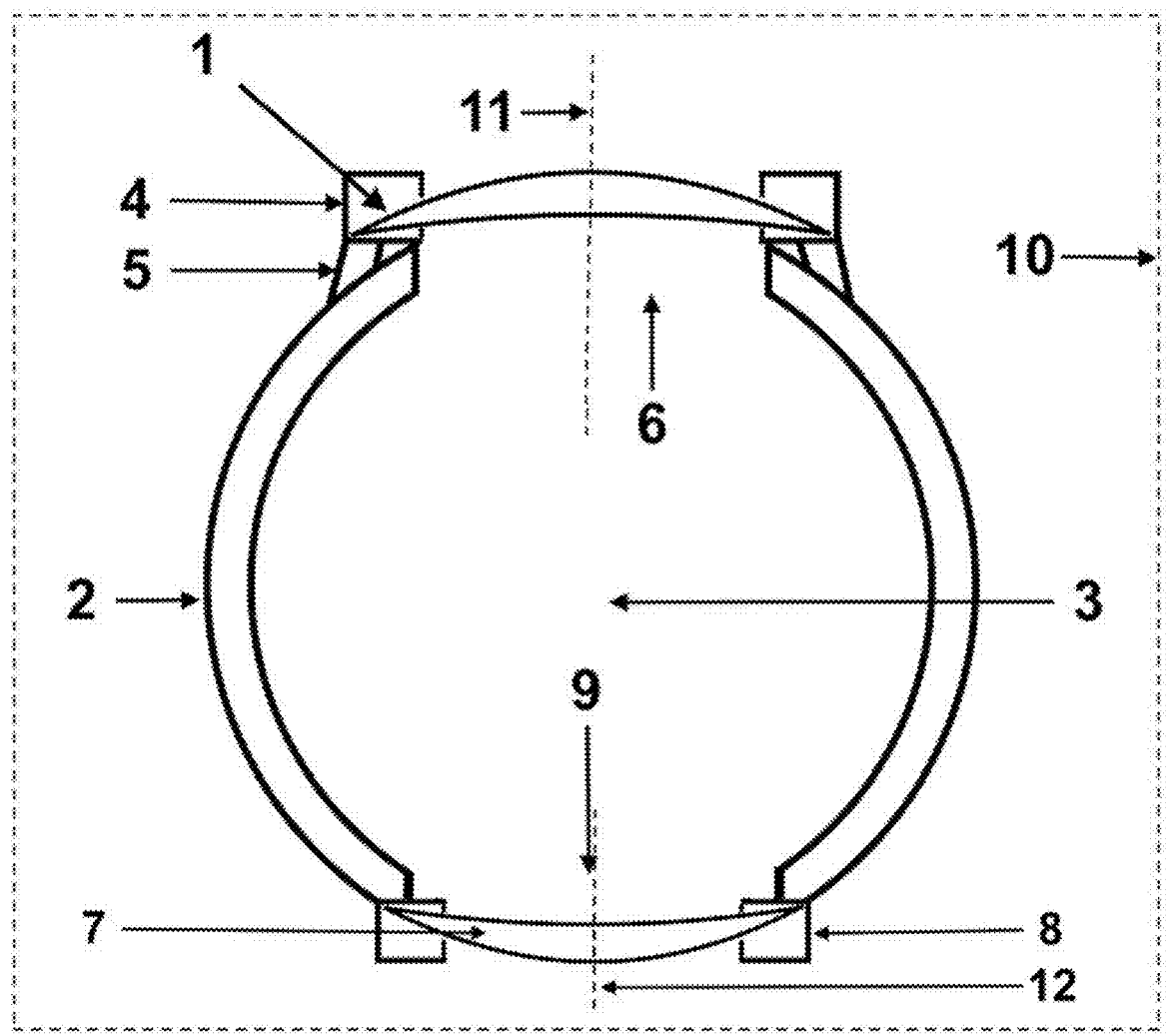
Figure 2.0- Cross Section of Side View of the Ring with 2 Lens

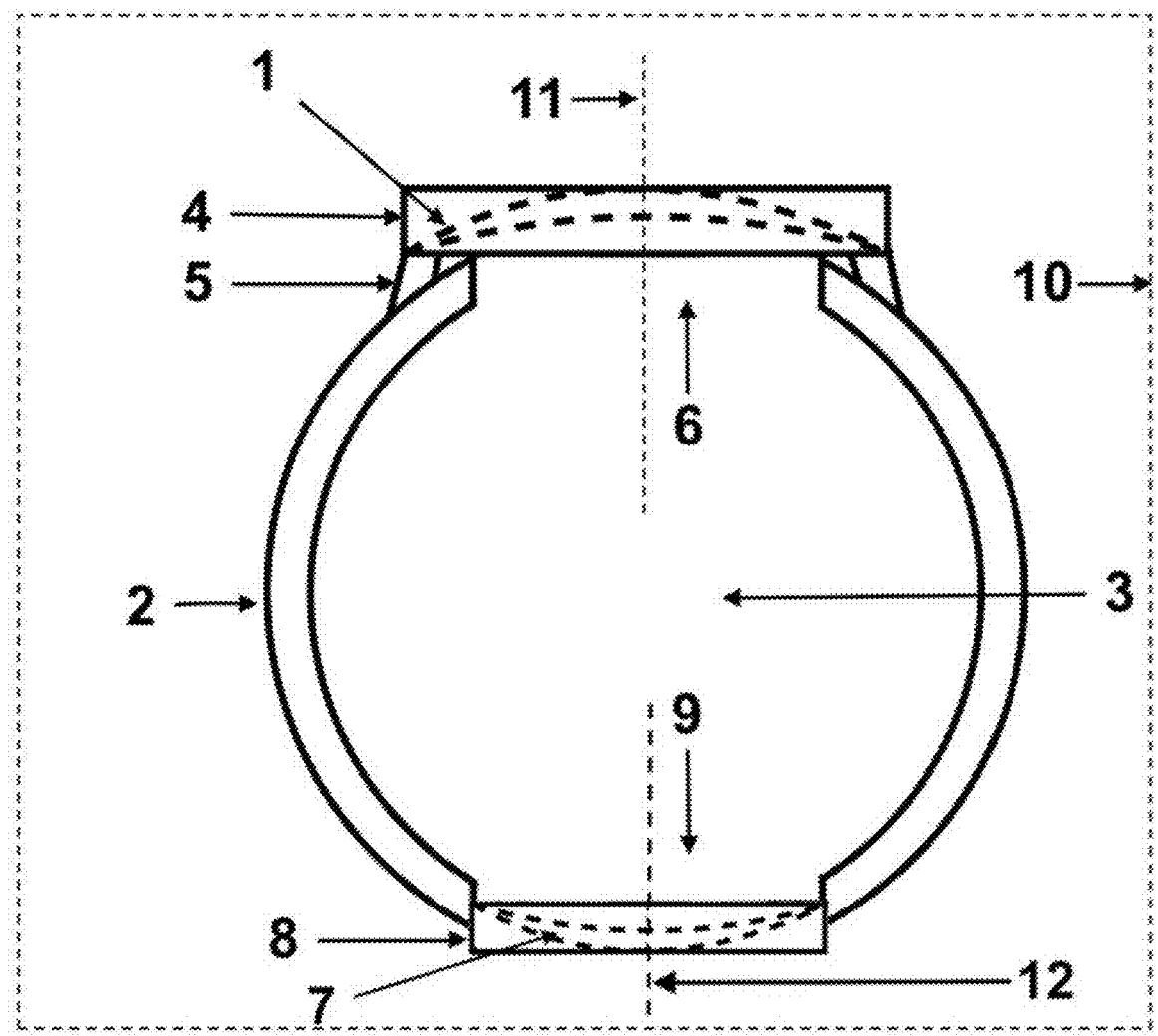
Figure 2.1- Side View of Ring With 2 Lens

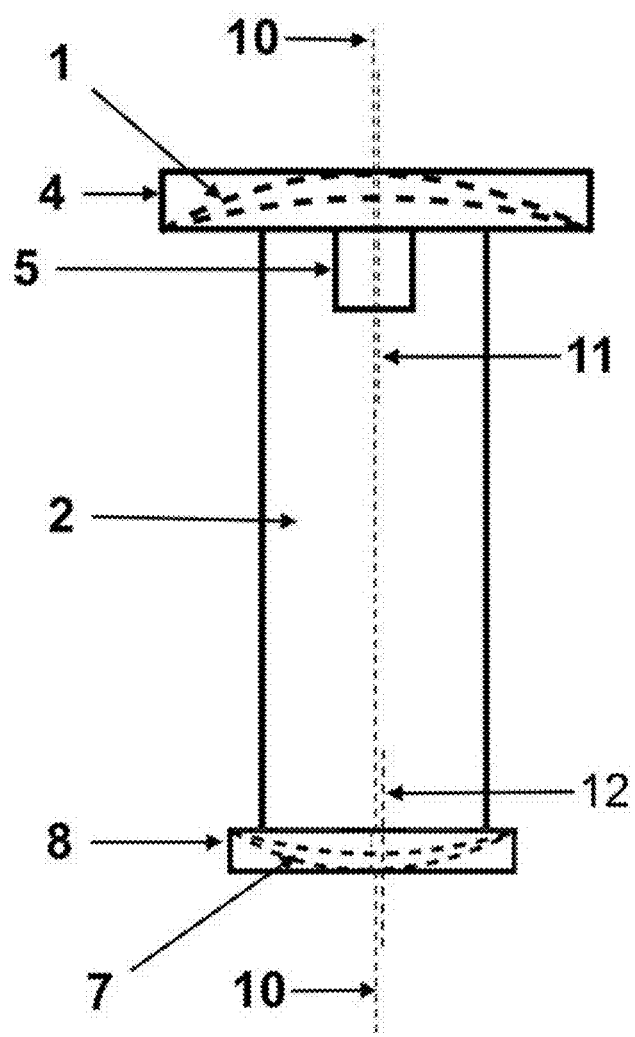
Figure 2.2- Profile View of the Ring with 2 Lens

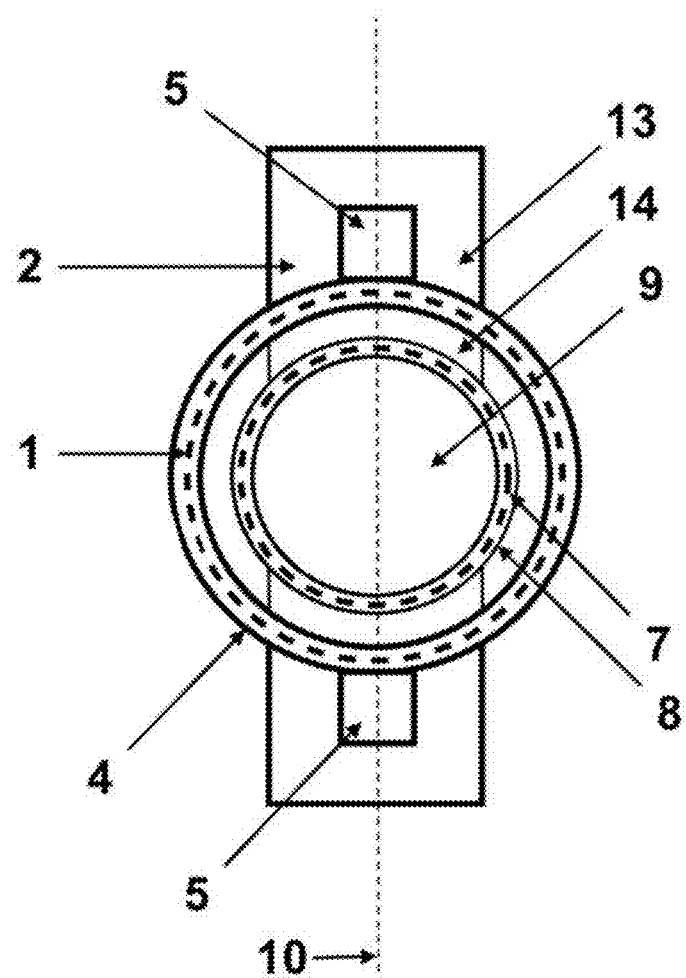
Figure 2.3- Top View of the Ring with 2 Lens

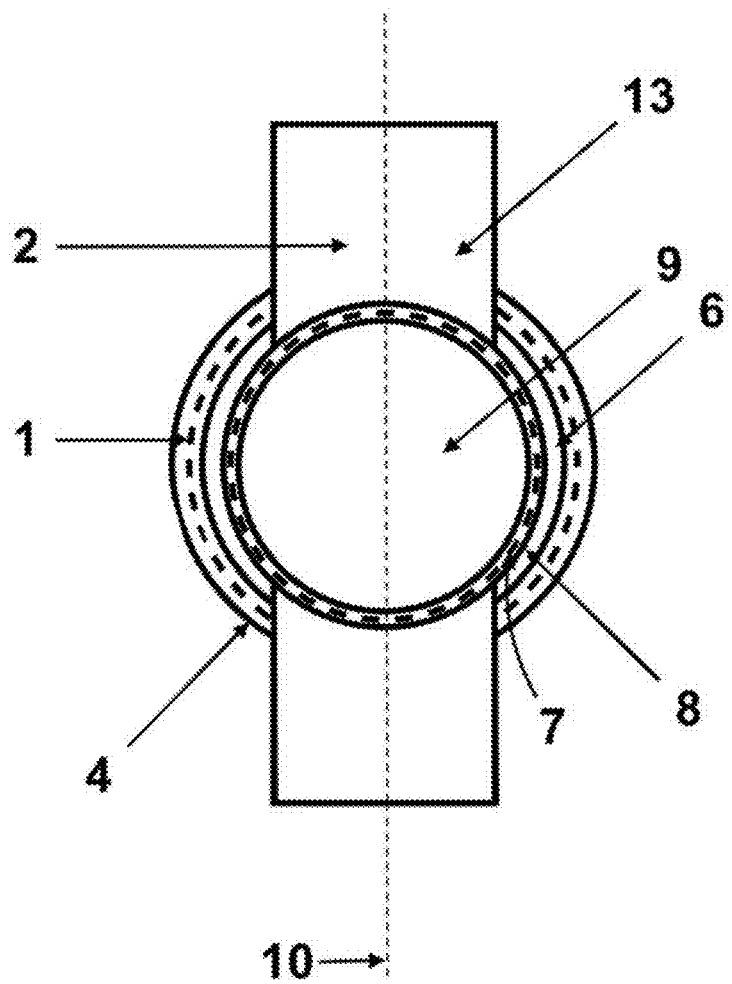
Figure 2.4- Bottom View of the Ring with 2 Lens

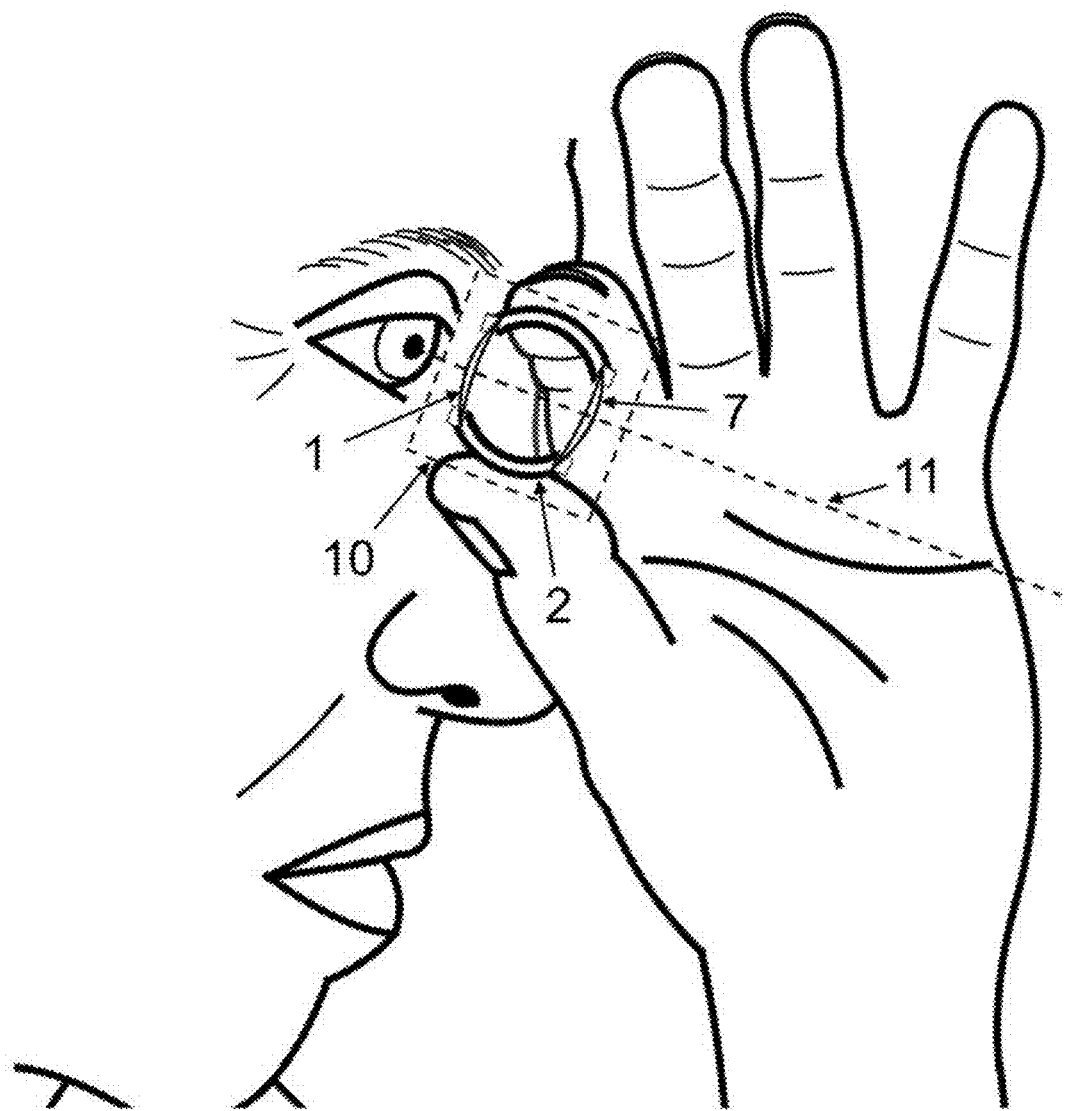

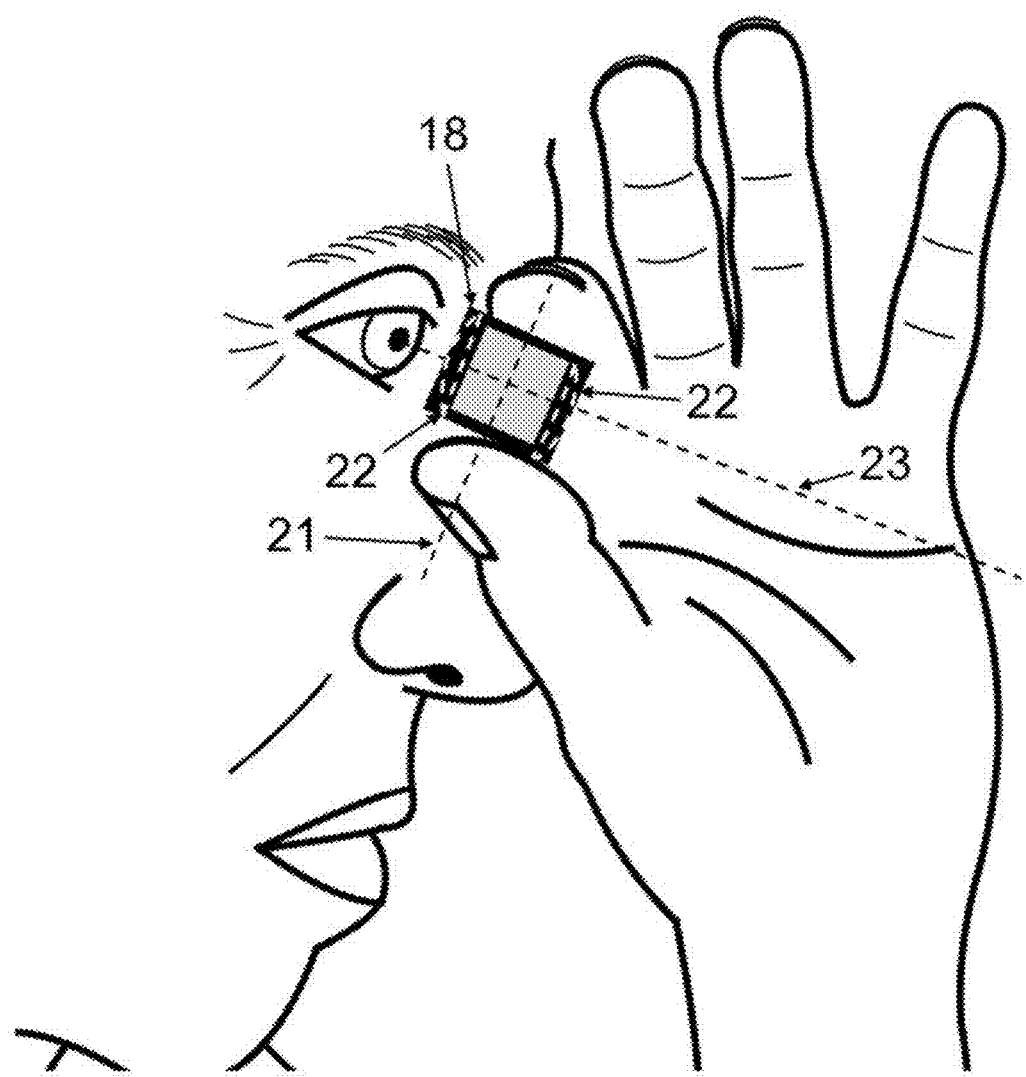
Figure 2.6- Two Lens Barrel-Loop- in Use

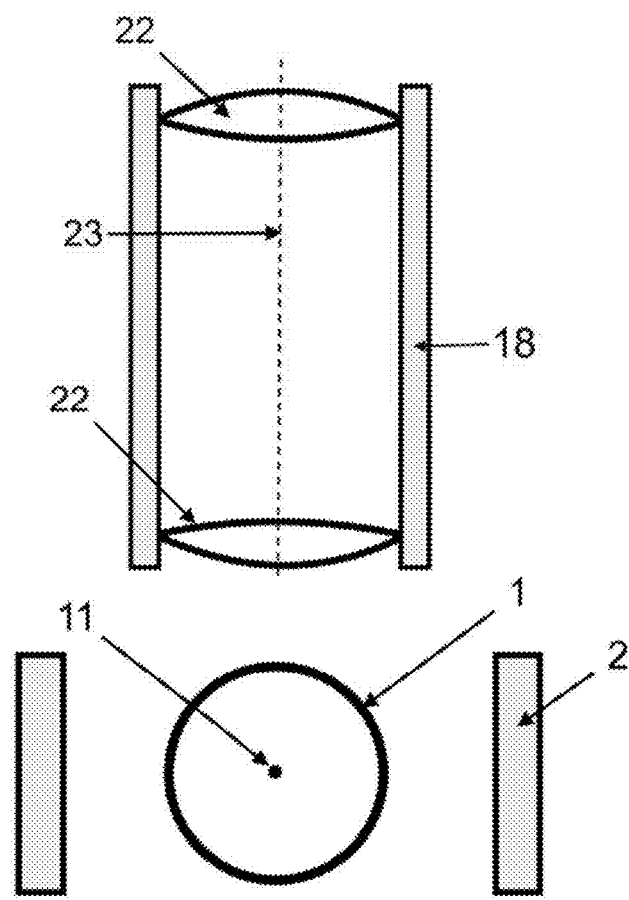
Figure 2.7-Transverse Section of The Optical Barrel

Figure 2.8-Cross Section of The Optical Barrel
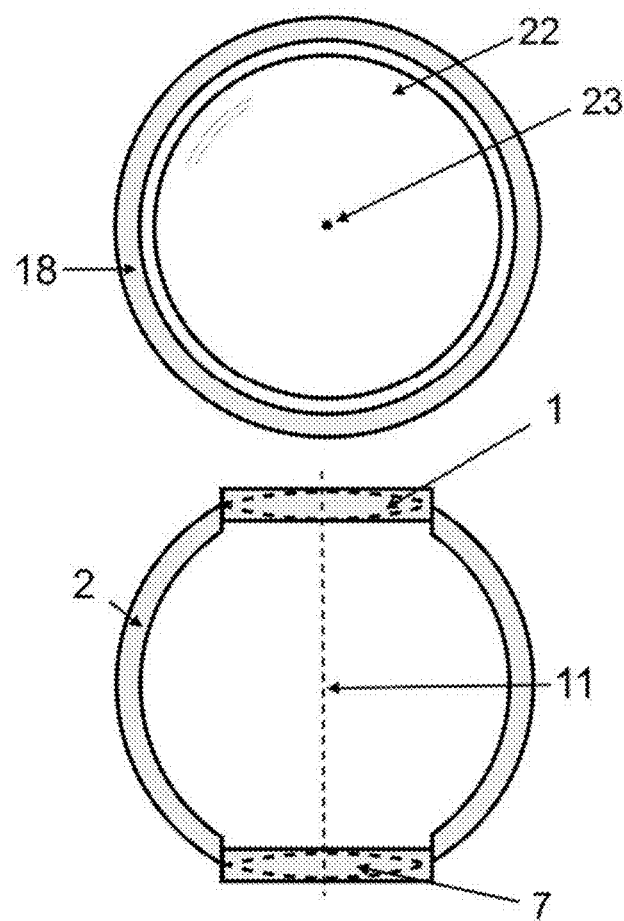

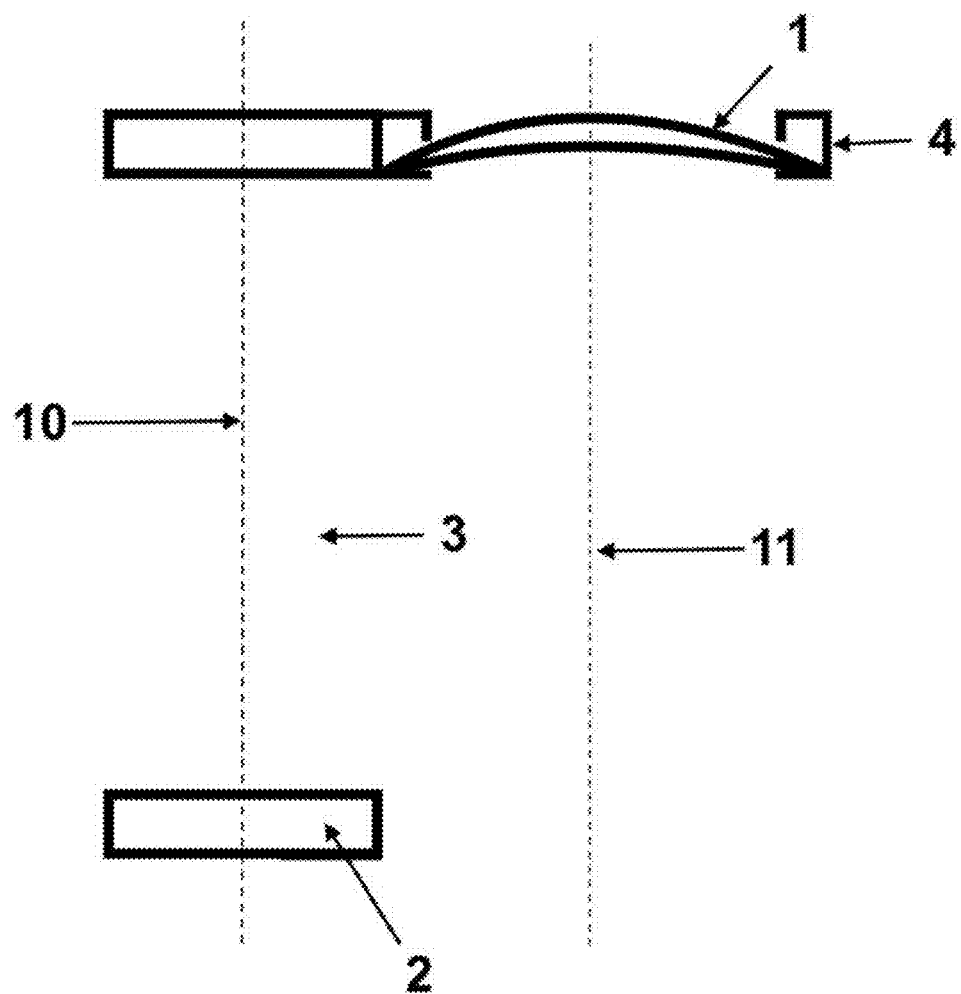

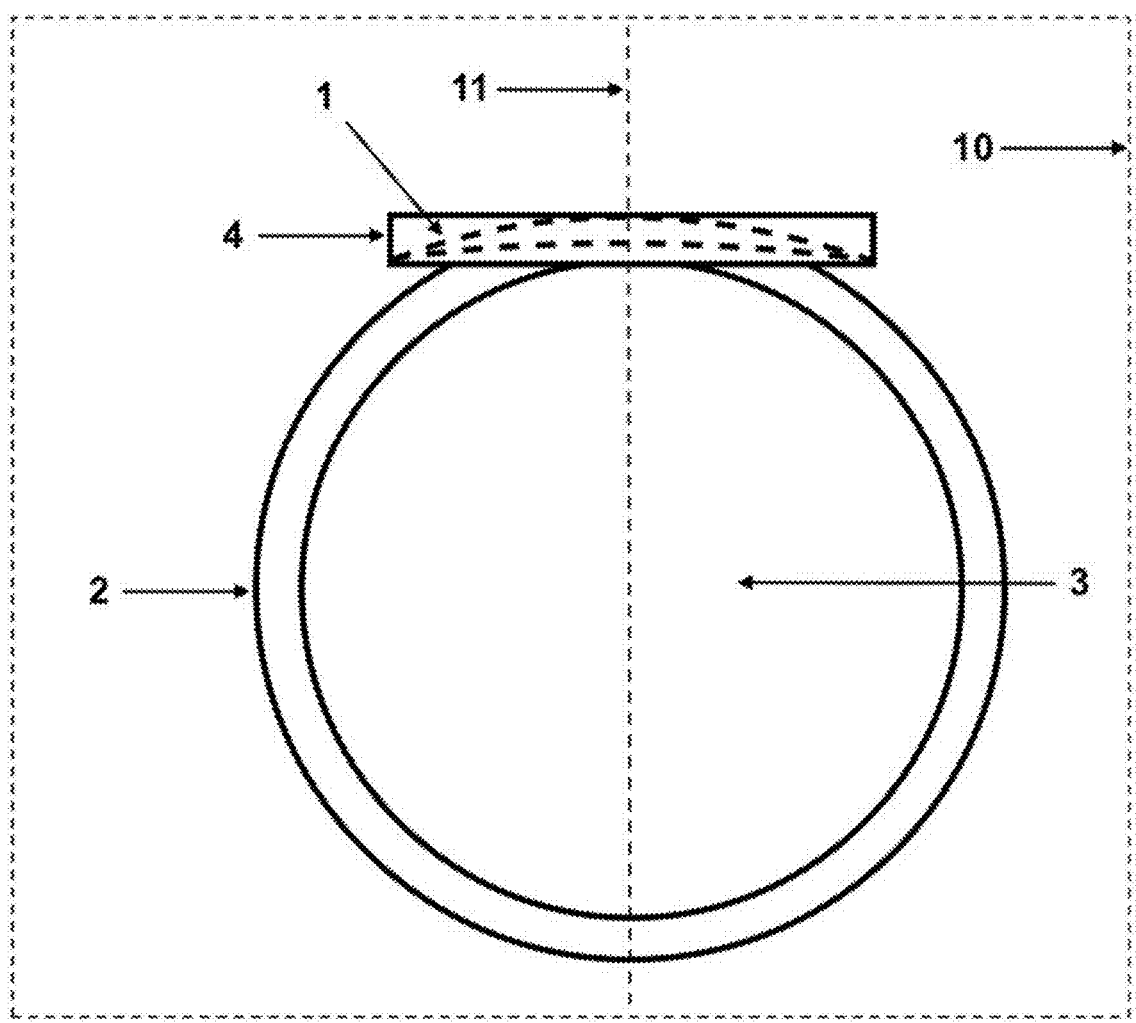

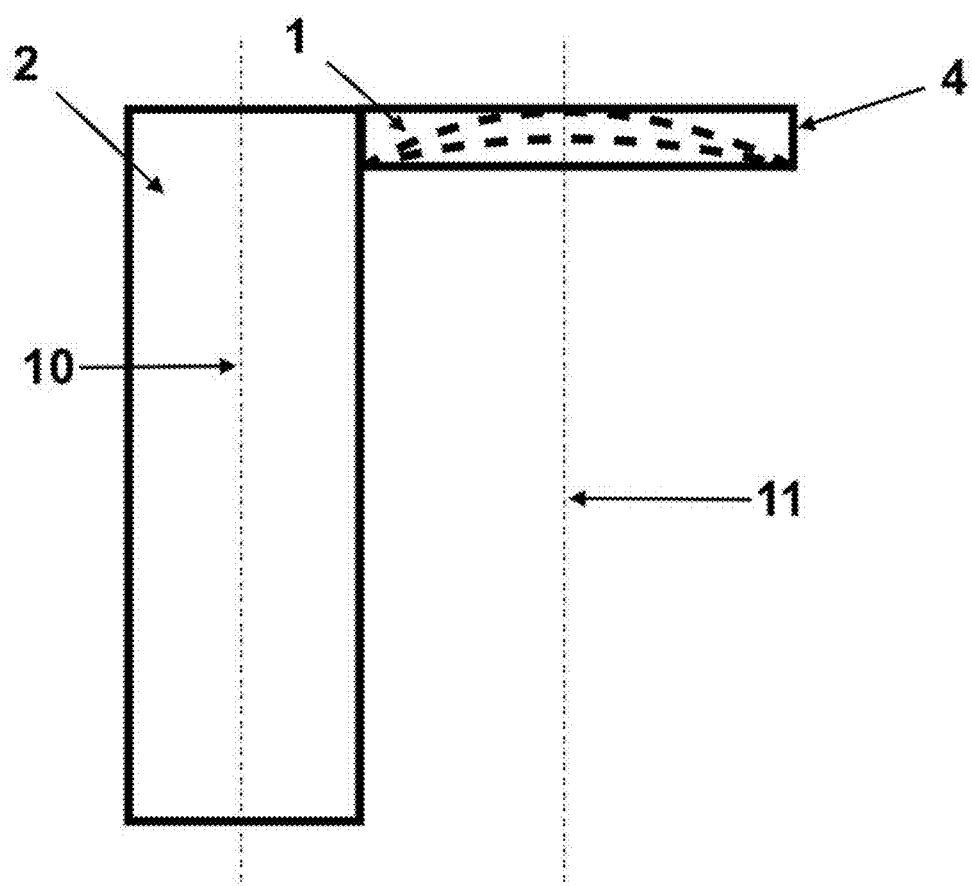

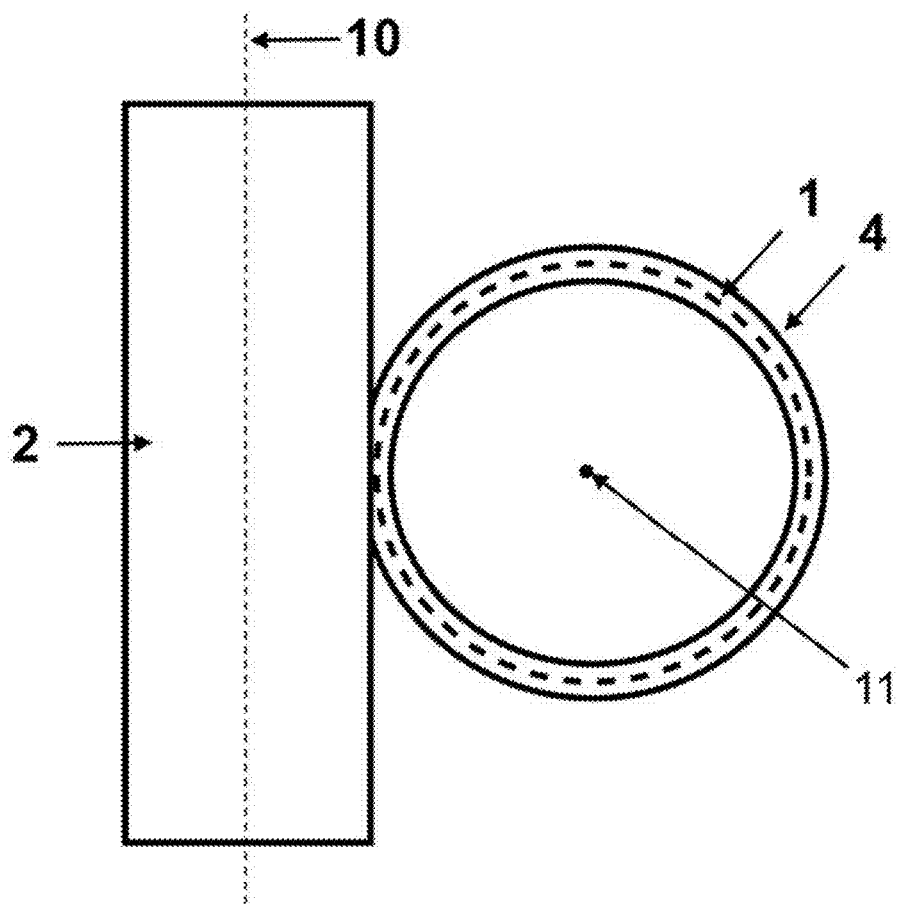
Figure 3.3- Top View of the Ring with 1 Shifted Lens

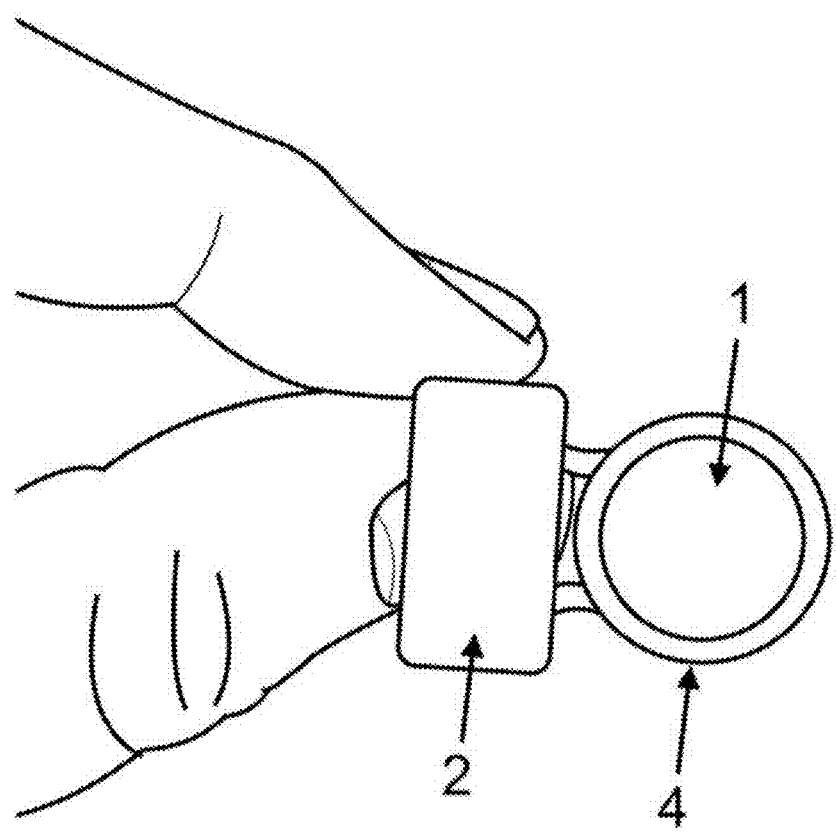

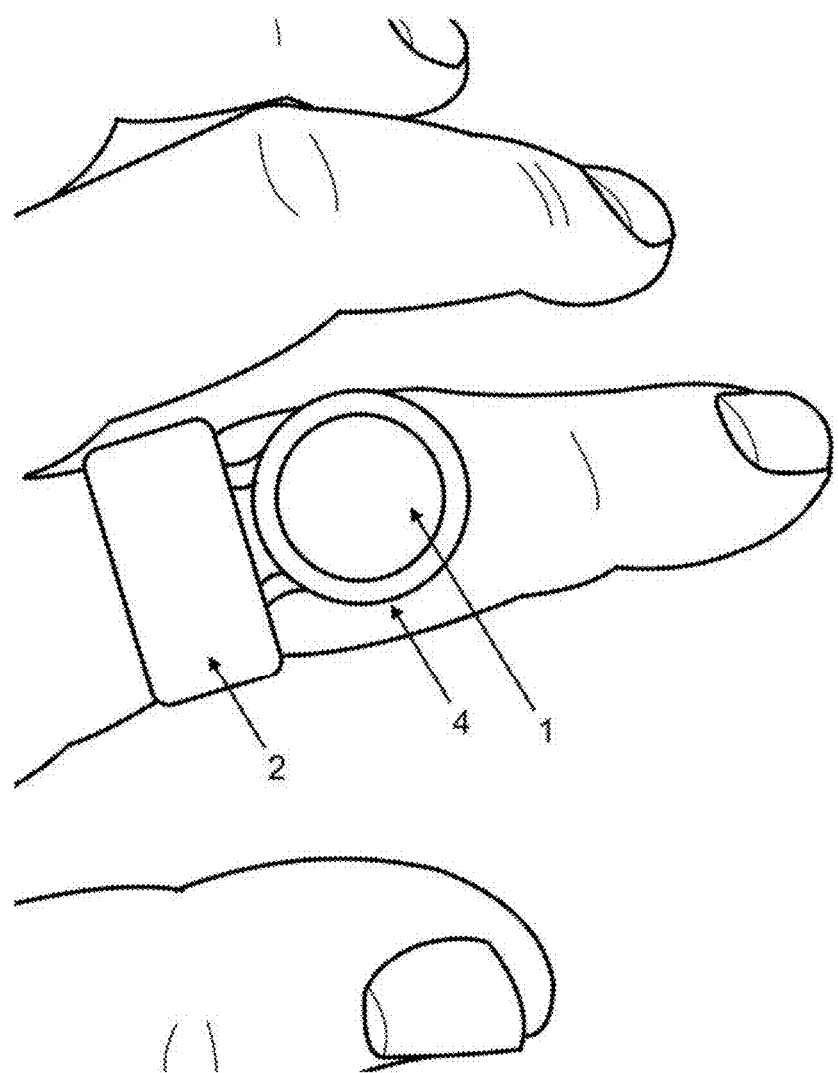
Figure 3.5 - Lens Worn as Fashion Item

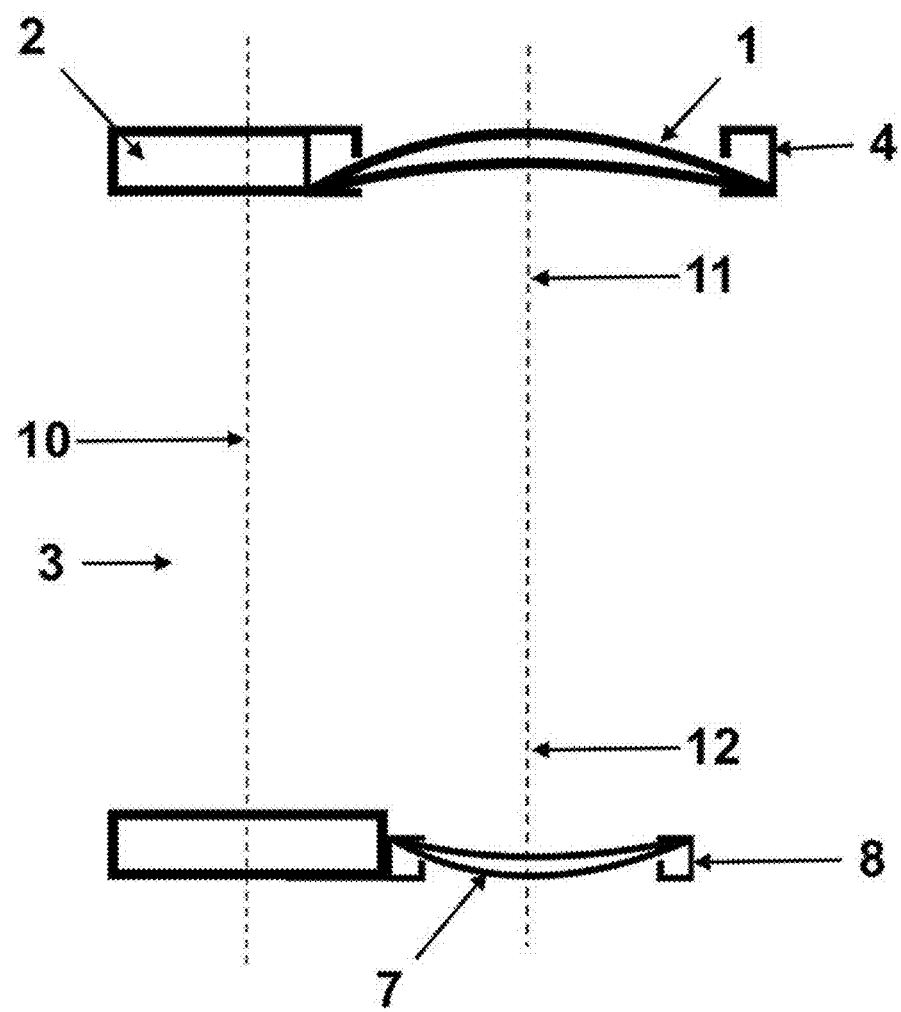

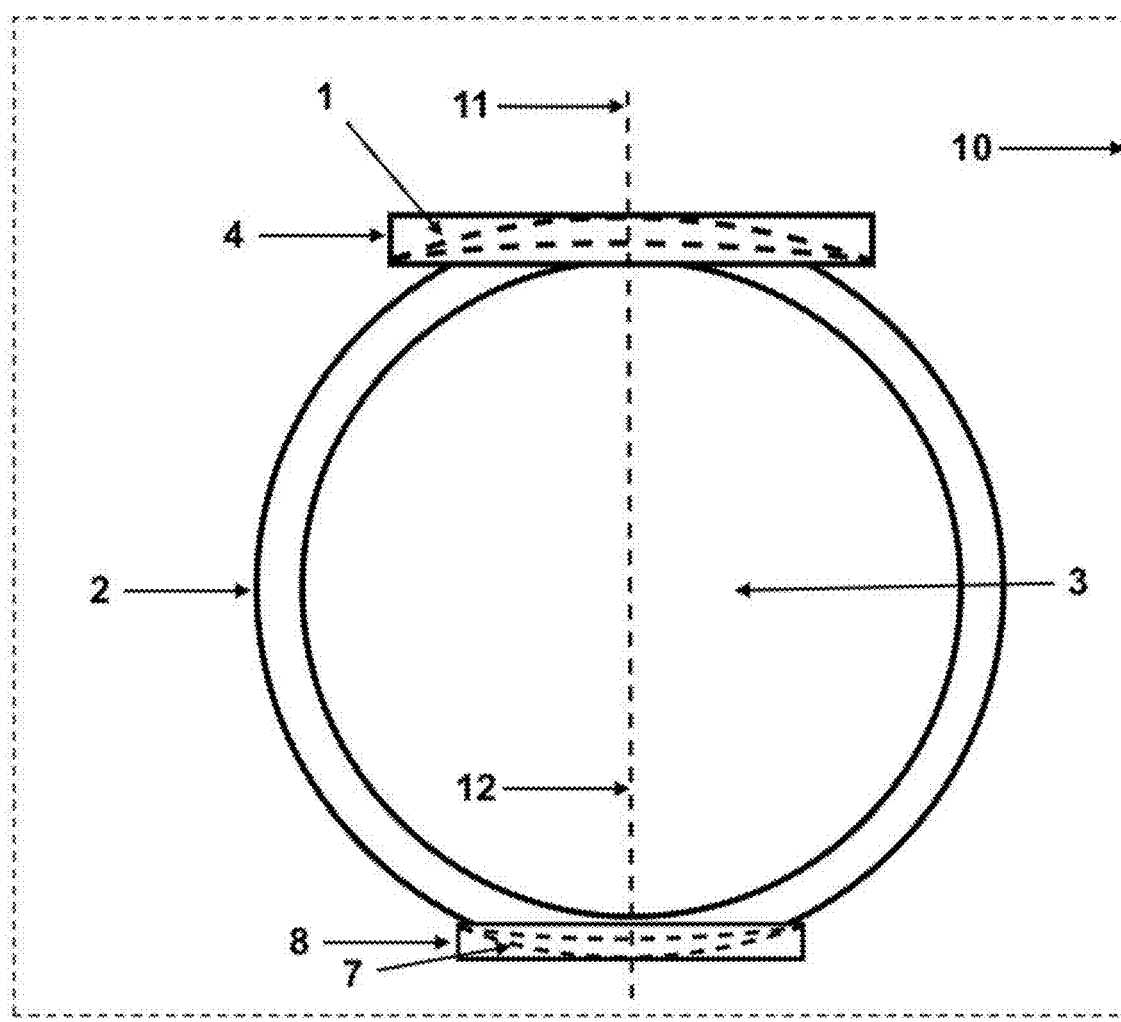
Figure 4.1- Side View of Ring With 1 Shifted Lens

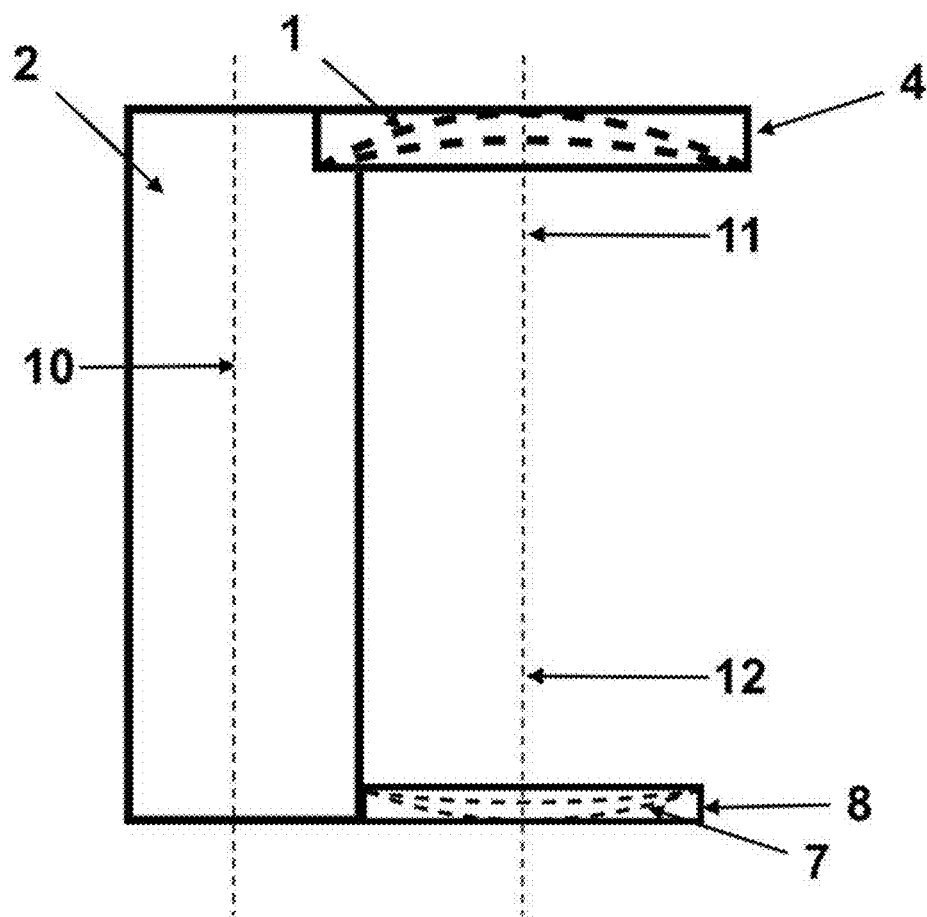

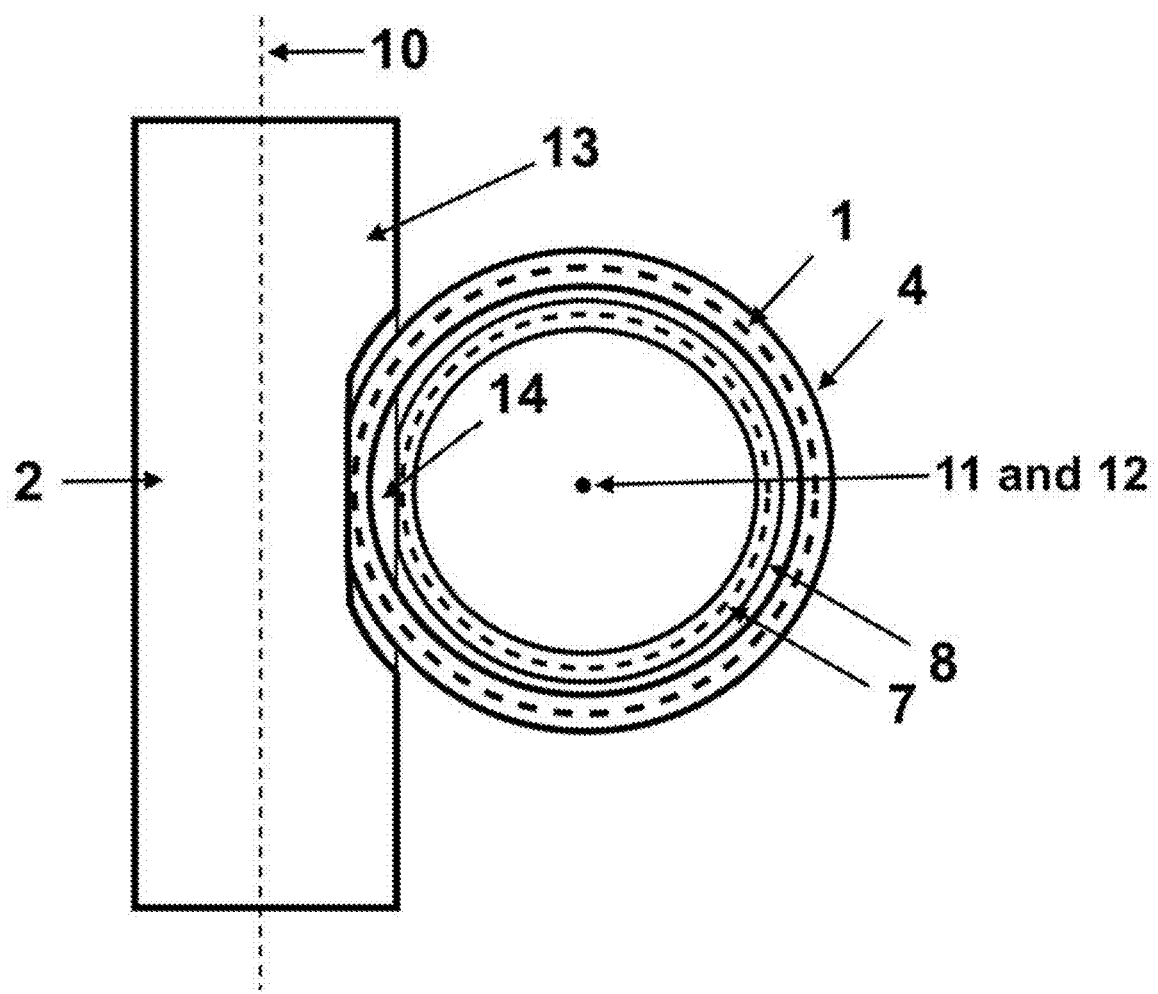

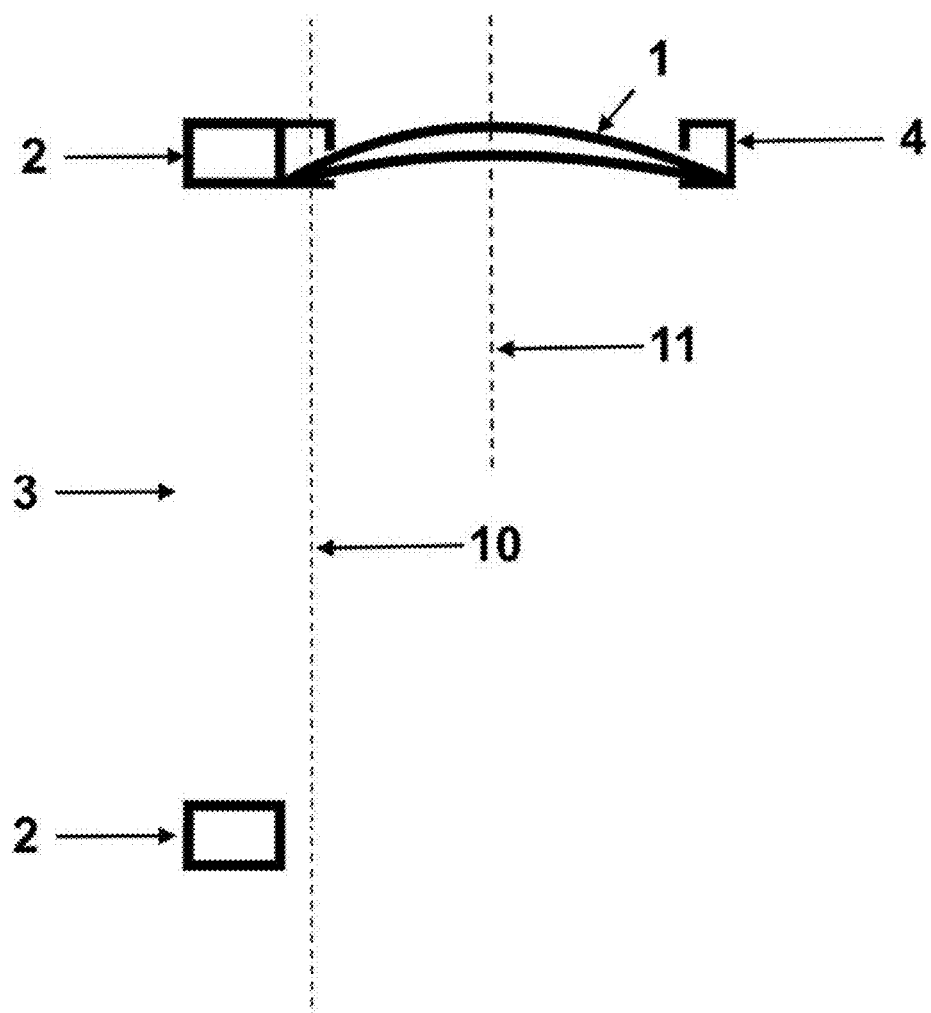
Figure 5.0- Cross Section of the Profile View of the Ring with 1 Partially Shifted Lens copy

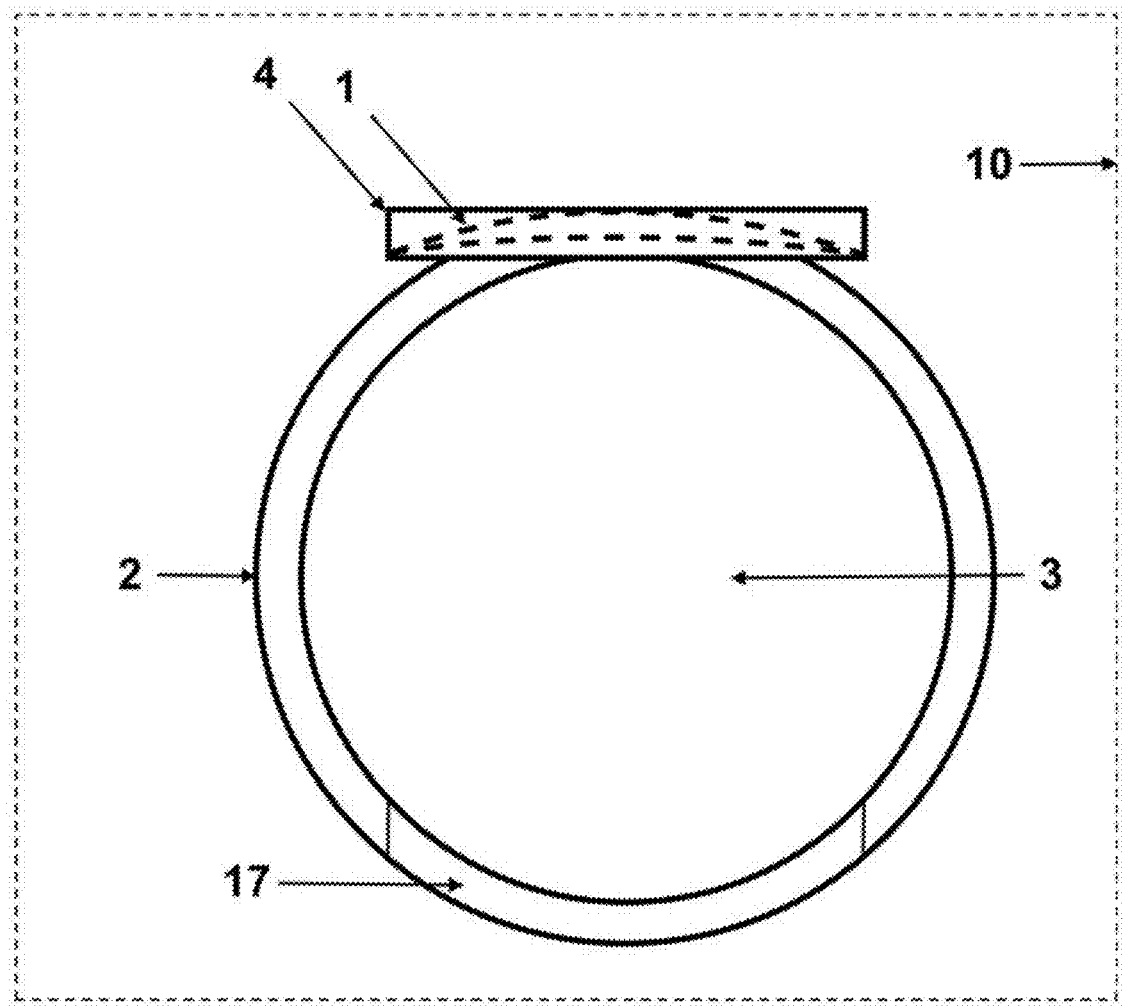

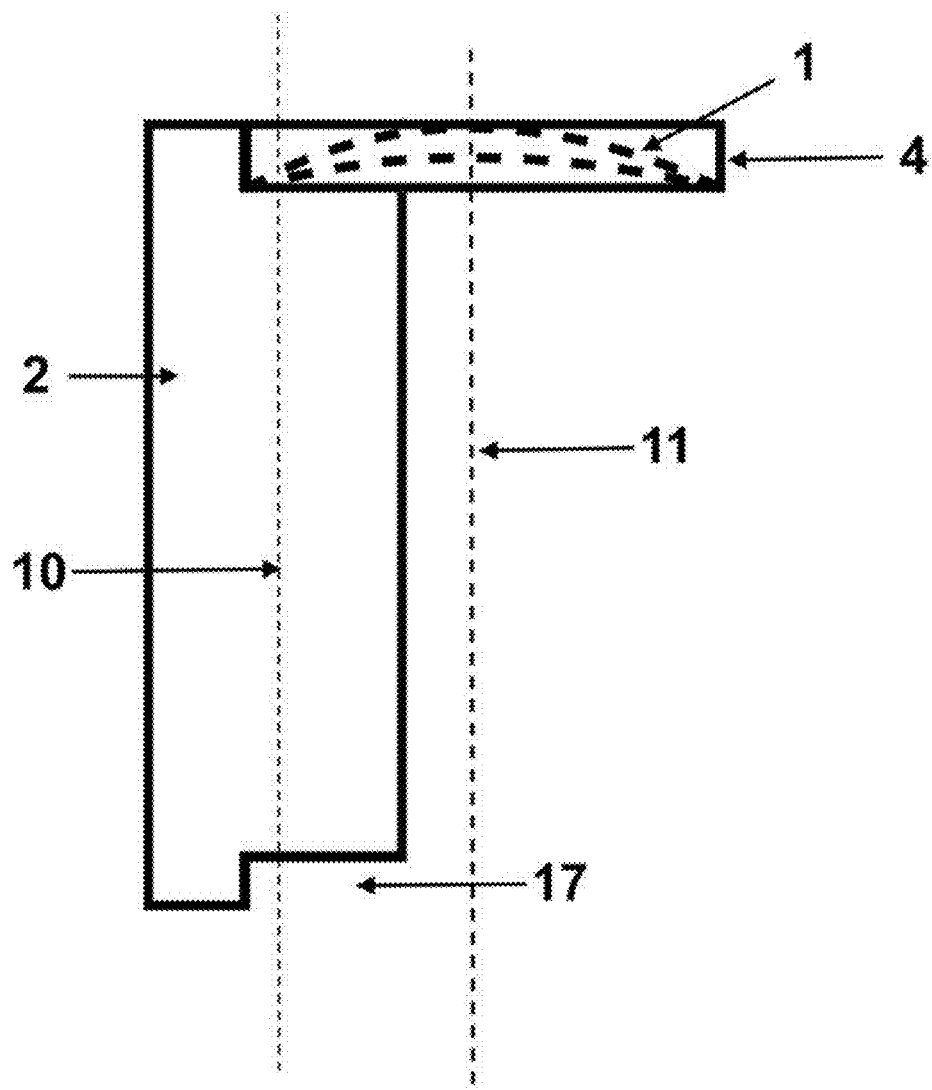

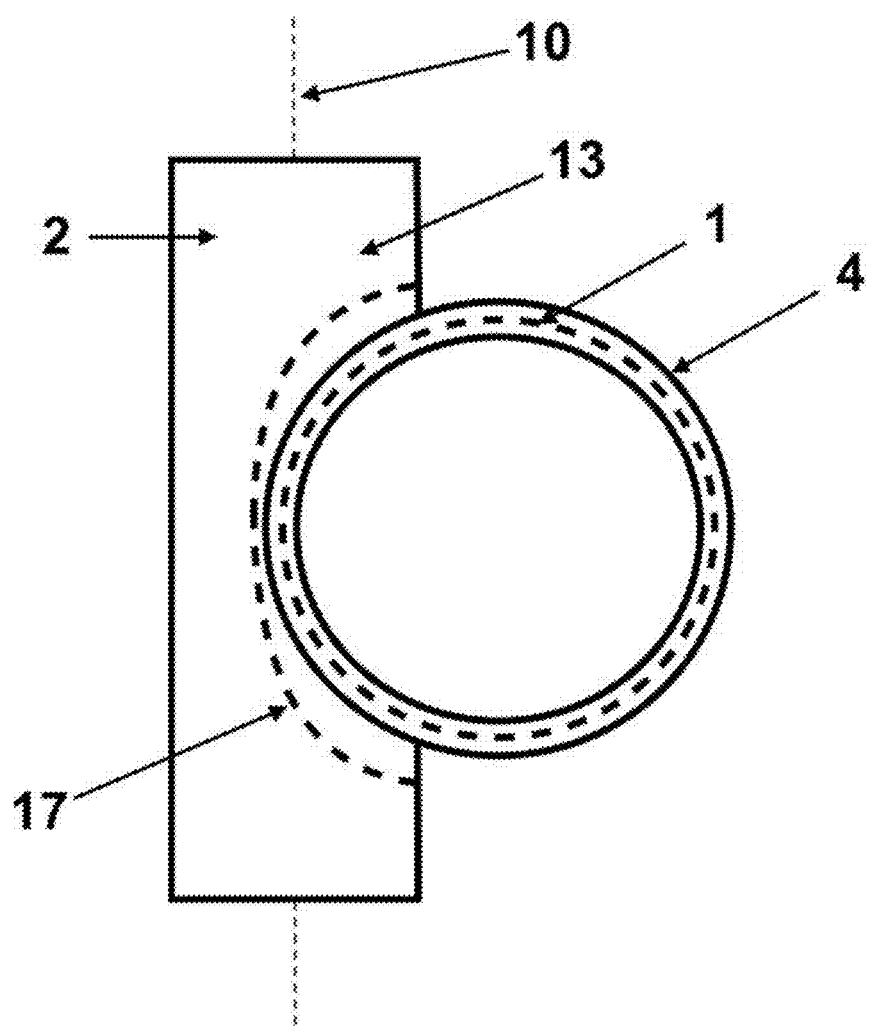
Figure 5.3- Top View of the Ring with 1 Partially Shifted Lens

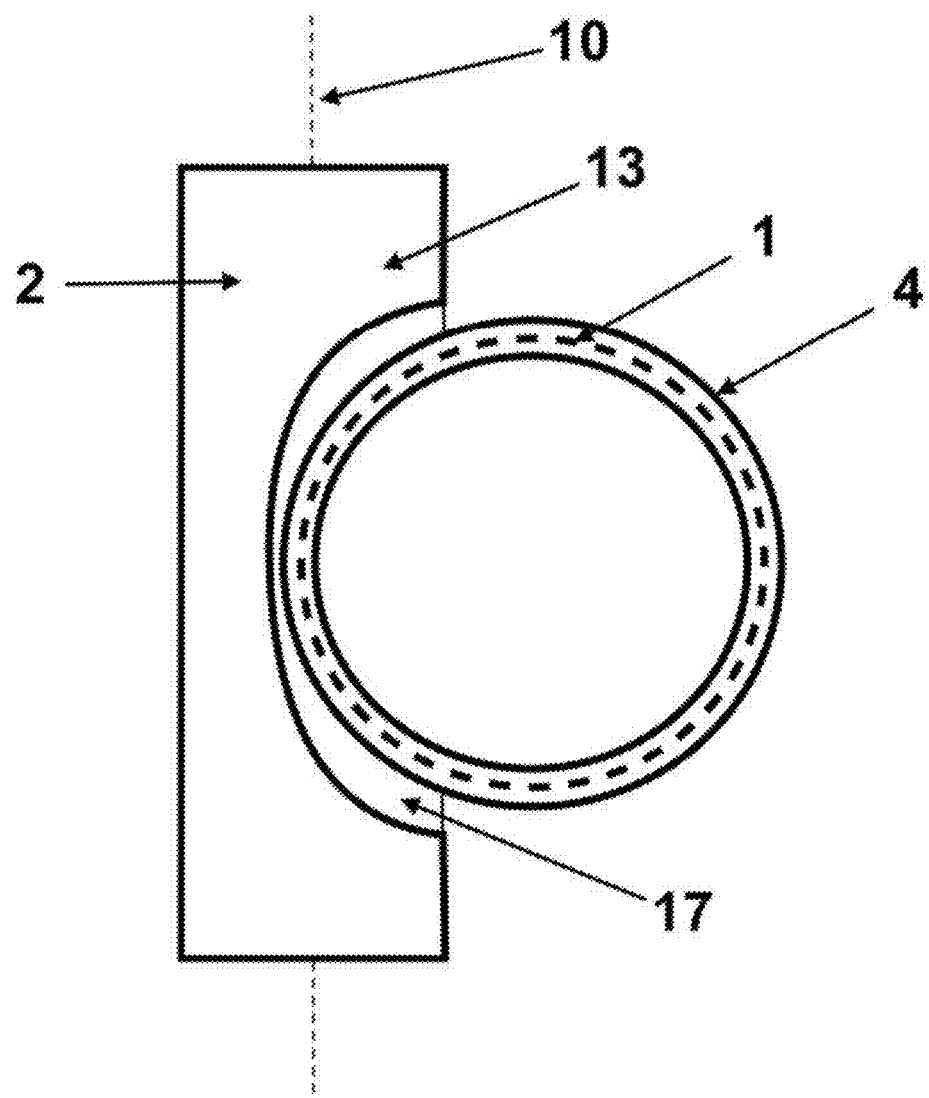
Figure 5.4- Bottom View of the Ring with 1 Partially Shifted Lens

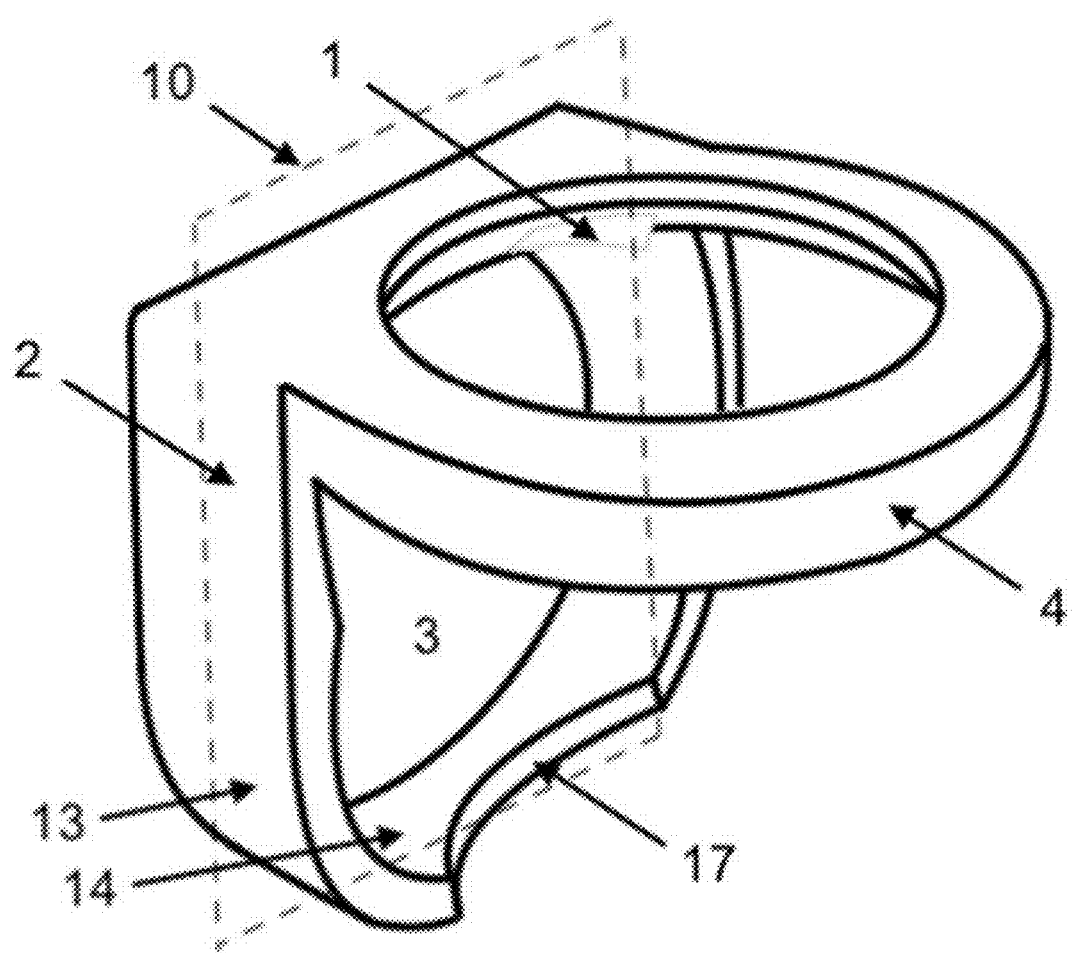
Figure 5.5- Perspective View of the Ring with 1 Partially Shifted Lens

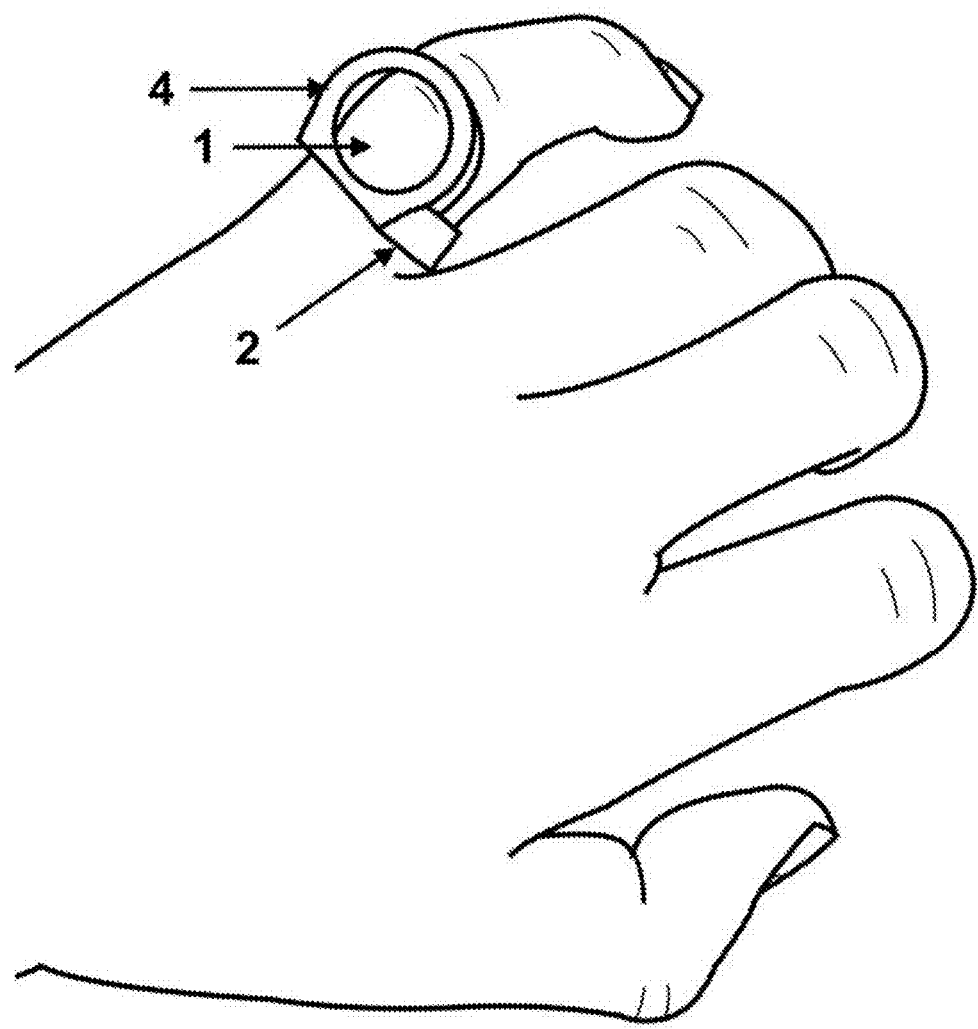
Figure 5.6- One Partially Shifted Lens Worn as Fashion Item

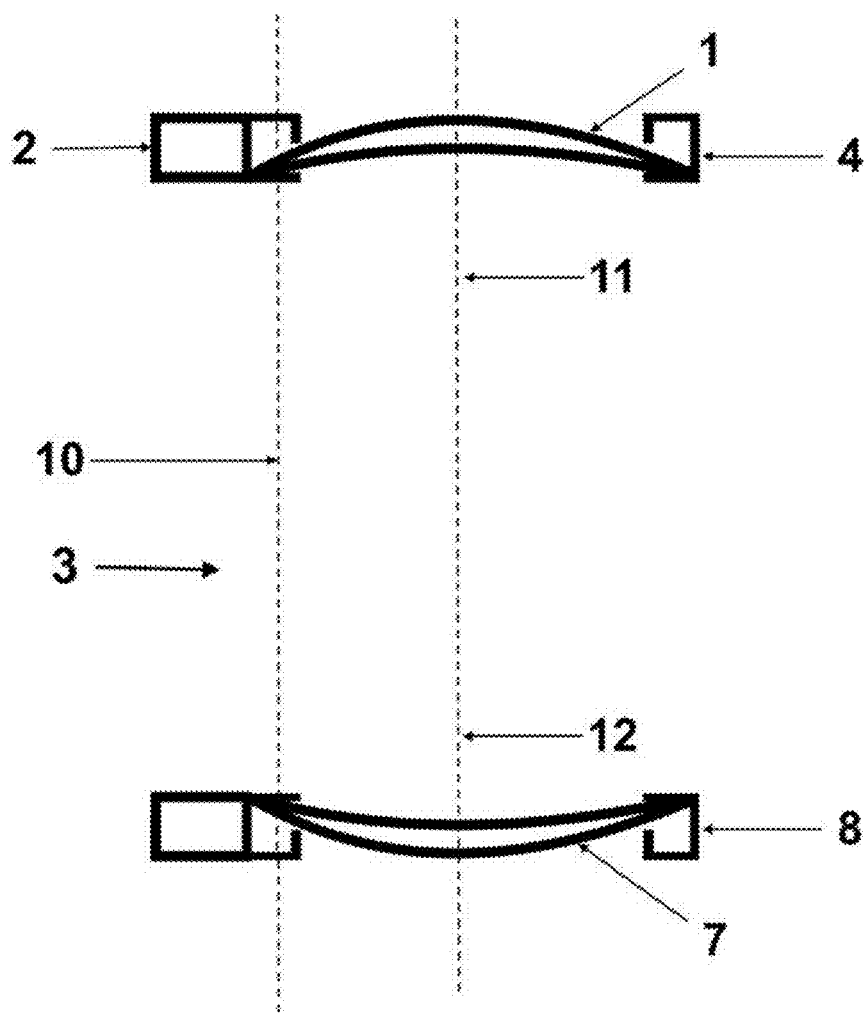
Figure 6.0- Cross Section of the Profile View of the Ring with 1 Partially Shifted Lens copy

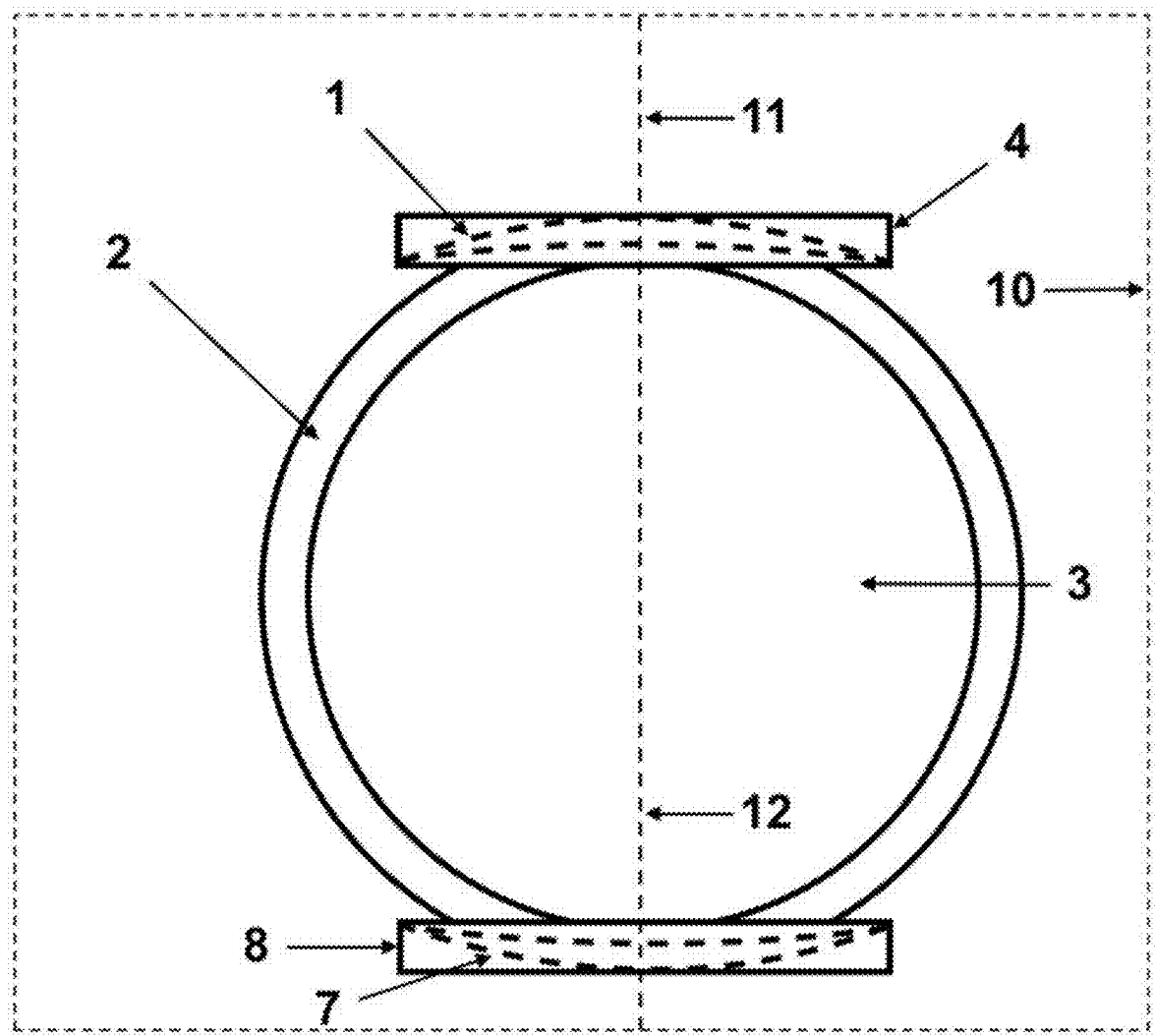

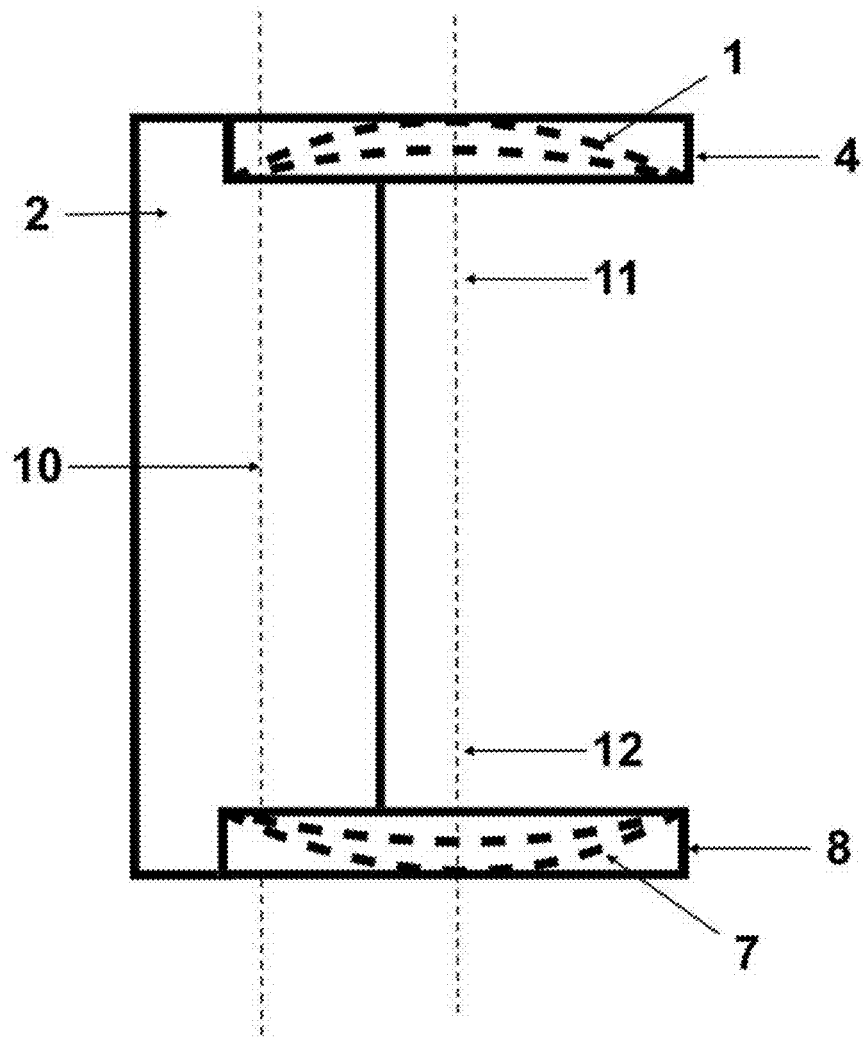

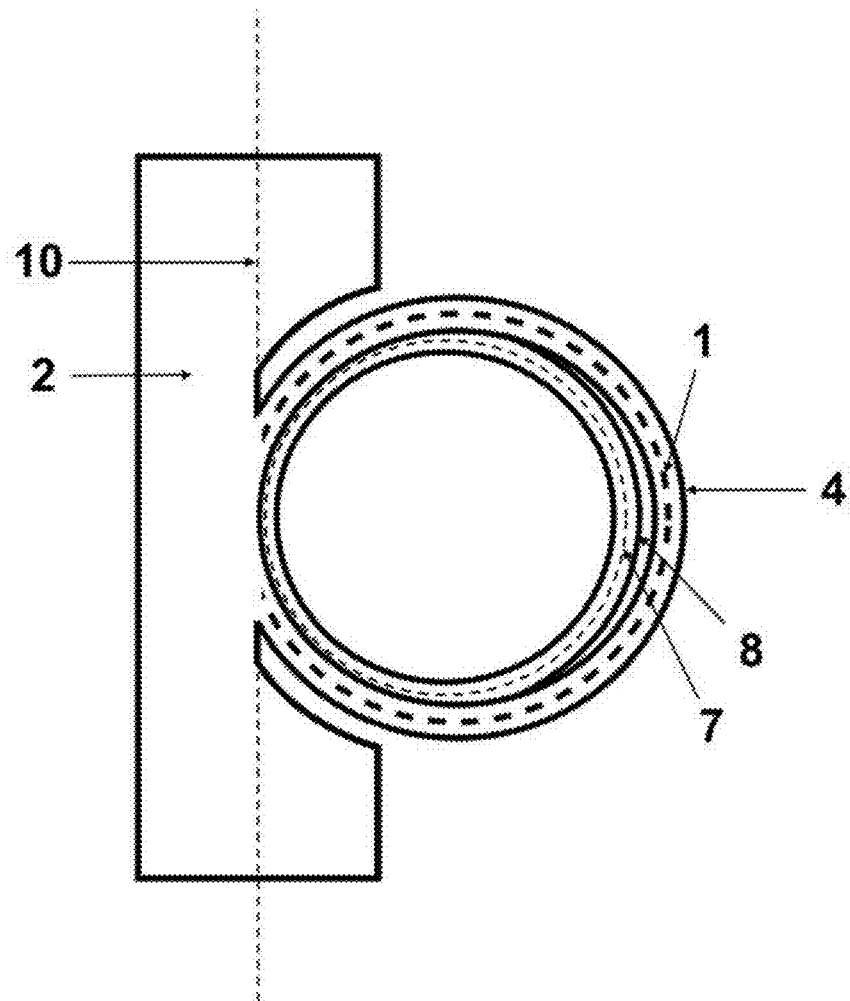
Figure 6.3- Bottom View of the Ring with 1 Partially Shifted Lens

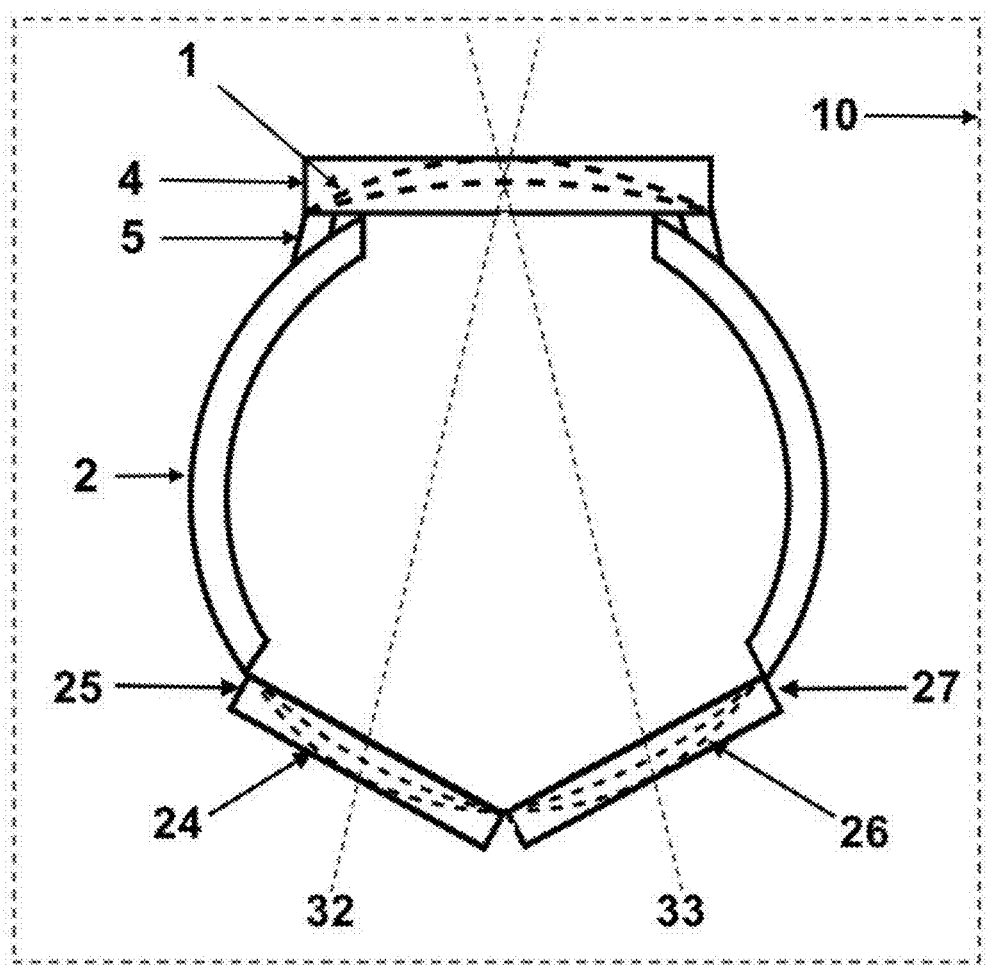

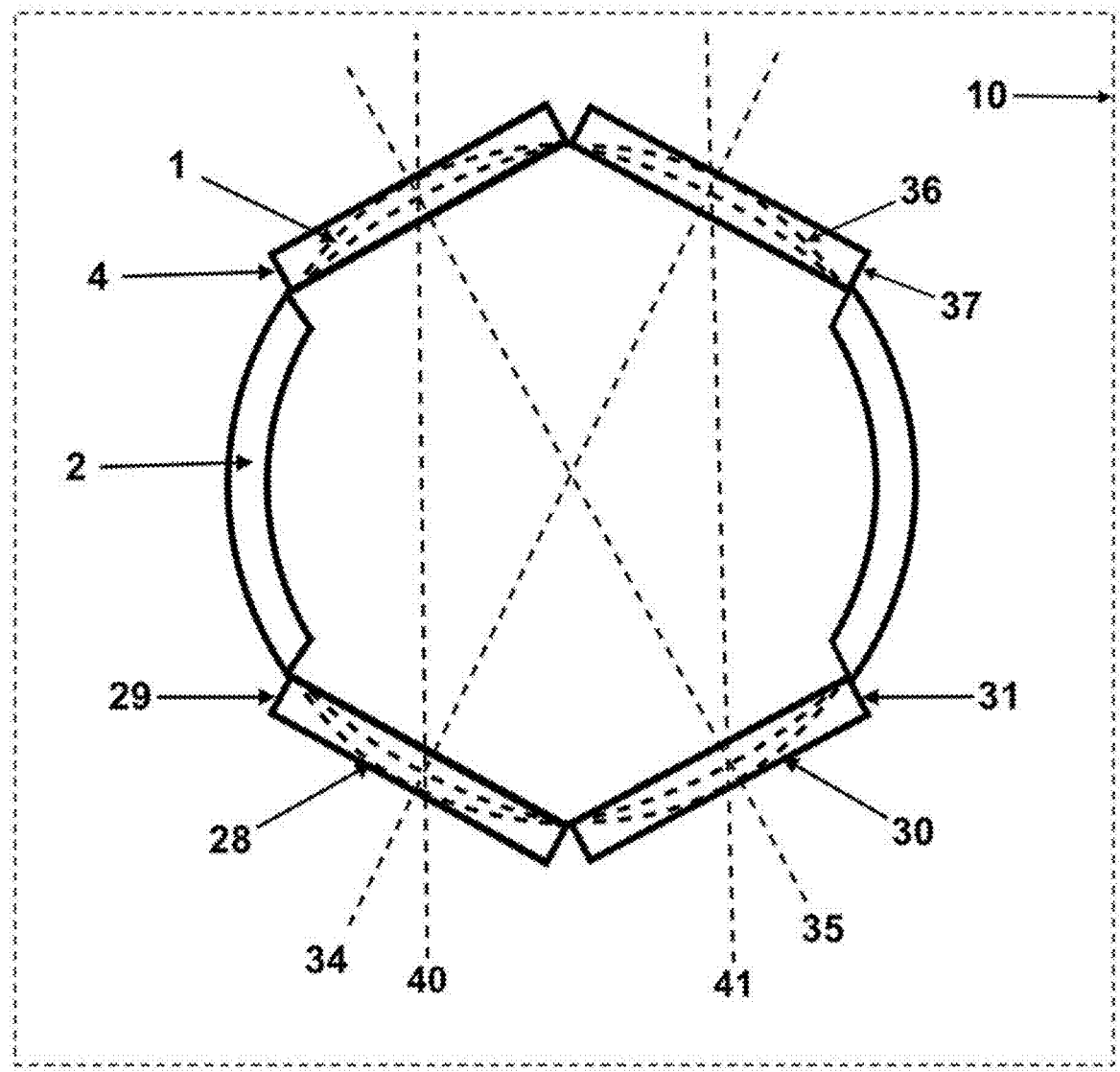

RING-SHAPED VISUAL AID

CROSS REFERENCE APPLICATION

This non-provisional application claims benefit of provisional application No. 63/077,582 filed Sep. 12, 2020 which is incorporated herein by reference in its entirety.

This application is a continuing-in-part application to U.S. application Ser. No. 16/252,626 filed Jan. 19, 2019 and claims benefit therefrom and is incorporated herein by reference in its entirety.

FIELD OF THE INVENTION

The present invention is within the field of visual aids and is described as a ring-shaped handle containing one or more lenses.

BACKGROUND OF THE INVENTION

Existing handheld visual aid tools provide for magnification in a variety of shapes and for a variety of reasons. Most are used for magnification. Some are handheld but most are placed on the face using binocular style frames. Hand held frames also come in a variety of shapes. Some lenses are placed on sticks, some on barrels, and some on rings. The ring-shaped handles are usually finger rings where the user places them on their fingers during use. The subject of this invention is a Ringed Shaped Visual Aid of the finger ring variety.

DESCRIPTION OF THE PRIOR ART

Patent number JP2004219533A by Tamotsu Watanabe in Aug. 5, 2004 discloses a "FINGER LOUPE". The invention is capable of being placed on a finger, such as a thumb, and then be twisted to provide a more useable angle. The invention uses a pivot joint to allow full rotation, and has a magnifier lens detachable attached to the lens holder. This invention is distinguishable from the present invention in that the specific intent of Watanabe's invention is to assist anglers with presbyopia so the device is placed close to the object to be enhanced thus allowing the angler to more easily attach the hook to the line. This device is not intended, nor can it be used in close proximity to the eye as the present invention.

Patent number FR529738A by Aime-Edouard-Adolphe Wattelier in Dec. 5, 1921 discloses a "MAGNIFIER SECURABLE TO THE FINGER".

Patent number U.S. Pat. No. 1,668,283A ('283 Patent) by American Optical Corp from May 1, 1928 discloses a "MAGNIFIER". The '283 patent as noted is substantially different in construction than the present invention. The '283 patent uses the rim to rotatably mount the lens to be secured in the hole defined by the frame member. The frame member has finger grips that the user can hold to use the lens. The lens can be used in its folded position or rotate 90 degrees to a useable position, and can also be rotated to 180 degrees and be used as a conventional magnifier. The disclosure makes specific mention that the frame member is substantially equal to the focal length of the lens. This invention is markedly different in its construction than the present invention. The lens in mounted in a lens holder that is pivotably mounted in a frame, where the frame is designed to the focal length of the lens, and the lens may be secured within the frame. The present invention does not have a specific frame to focal length diameter. In fact, the users ring bears no manufacturing or geometric requirement to the lens. In the present invention the frame has a specific curvature that matches a safety boundary, and the lens-frame apparatus has a specific distance from the cornea of the user's eye for protection. The present invention pivots along an axis parallel to the axis of the ring and not perpendicular to the ring as is shown in the '283 patent.

Patent Number DE202007008693U1 by KOELZ-OTT MONIKA in Aug. 23, 2007 discloses a "MAGNIFYING GLASS FOR RING OR JEWELRY". This patent by Koelz-Ott Monika describes a lens that is held in a holder that is mounted in a ring-like device. The user would "flick" the wrist and the magnifier would be pivoted at a right angle from the axis of the ring into a reading position. While the use of a ring is disclosed the actual use and mounting of the "Monika" patent is substantially different. The present invention uses extensions to secure the lens onto a curved frame that has a window therein, allowing a user to view through the lens at a distance between 2.5 and 3.5 mm from the cornea of the user's eye, or more specifically, the distance is greater than that described by the boundary plane. Additionally, the frame-lens feature of the present invention pivots along the axis of the ring and not at a right angle as described in the Monika patent.

Patent number CN201831172U in May 18, 2011 discloses a "NAIL CLIPPERS WITH MAGNIFIER". This patent describes a conventional nail clipper that has a convex lens attached to a lens frame, which is attached to the pressing plate of the nail clipper using a connecting rod. This is a very simple device, and the nature of clipping nails leads a user to place the clipper at a distance from the eyes in order to clip the toe nails.

Patent number CN2357342Y in Jan. 5, 2000 by 万利（光学）塑胶厂有限公司 discloses a "FOLDABLE MAGNIFIER." This patent describes a lens and frame that is contained in a mirror box frame, where the frame and lens "cartridge" is pivotably connected with a spring to the mirror box frame. The frame has a locking means that uses a "button" to release the frame and lens and the spring moves the loupe to a viewable position. The mirror box frame has a slot to allow the frame and lens to pivot within and be secured since there are covers that are boned onto the mirror box frame to protect the loupe when not in use.

Patent number JP2006215414A by Hiromitsu Hirota from Aug. 17, 2006 discloses a "MAGNIFYING GLASS." This invention is specifically designed to mount a loupe to the thumb or index finger and has a rotating axle mount to magnify the fingertips. In order to improve the visibility of the objects, a LED diode is used to illuminate the objects to be viewed. The lens is attached to a frame which is universally attached to the rotating axle mount. This invention is specifically designed to be removable and not attached to a ring and worn as jewelry as the present invention.

Patent Number U.S. Pat. No. 4,133,603A by Inouye Hajime from Jan. 9, 1979 discloses an "EXTRA HAND MAGNIFYING GLASS" This patent uses a plastic one-piece body that has a shape wherein the lens can be secured to the frame which is essentially a circular structure. There is an additional circular structure as defined as part of the that is resilient enough to be secured around a user's thumb or finger. The body contains multiple circular structures that cross each other. The patent is specific in use for sewing and reading, but must be held near the printed word or the sewing operations. This devise is specific in that the construction is planar. As previously noted, the one piece body is flexible and is comprised of circular or sine-wave shaped planar body. This patent is demonstrably different that the present invention. The one-piece body is flexible and planar where the present invention uses an circular or square shaped frame that is fixed to the ring. The one-piece body must be flexible in order to be used and the lens is secured in a circular portion of the body. The frame in the present invention secures the lens.

SUMMARY OF THE INVENTION

The current invention is a novel form of ring-shaped visual aid. What makes this invention unique is that the optical axis of the lens or lenses that are connected to the ring handle is(are) contained within or very close to the main plane of the ring. In addition, the lens or lenses is/are also parallel to the circumferential plane of the ring. Therefore, the frame or frames that contain the lens or lenses are integral parts of the ring handle and are rigidly connected as well as being fully integrated with the ring handle.

Such unique characteristics allow the user to wear the fully integrated ring-frame for extended periods of time as is done with any common jewelry item. This invention also allows the user to enjoy the optical benefits of such a visual aid without the inconvenience of having to manipulate the long and flexible extensions of the existing ring handles that are prevalent in the prior art. The lack of a rigid integration in existing prior art prohibits a user's ability to wear the lens-frame-handle apparatus on his/her finger for extended periods.

It also must be noted that traditional ring-shaped handheld visual aids only use one lens. The explanation for this is that the existing art lacks structural rigidity, integration within the ring, and also a mis-orientation of the lens. Since the optical axis of the current invention is parallel to the main plane of the ring, multiple frames containing multiple lenses can be placed on opposing sides of the ring. In such a arrangement, the opposing lenses will then share the same optical axis and would be then considered a bi-lenticular visual aid. Such multi-lenticular visual aids is novel and unique amongst available ring-shaped systems.

Finally, by introducing an optical system that can be rigidly and functionally integrated into a finger ring, a wide array of optical as well as aesthetic designs can be created. The diverse optical options that can be generated and the multitude of jewelry ring designs that can be used make for a wide array of utility options for the user. Such utilities can be convenient single or double lens magnification or a single lens monocle.

DESCRIPTION OF THE DRAWINGS

FIG. 1.0—Cross Section of Side View of the Ring with 1 Lens
FIG. 1.1—Side View of Ring With 1 Lens
FIG. 1.2—Profile View of the Ring with 1 Lens
FIG. 1.3—Top View of the Ring with 1 Lens
FIG. 1.4—Bottom View of the Ring with 1 Lens
FIG. 1.5—One Lens Worn as Fashion Item
FIG. 1.6—Two Lens Ring in Use
FIG. 2.0—Cross Section of Side View of the Ring with 2 Lenses
FIG. 2.1—Side View of Ring With 2 Lenses
FIG. 2.2—Profile View of the Ring with 2 Lenses
FIG. 2.3—Top View of the Ring with 2 Lenses
FIG. 2.4—Bottom View of the Ring with 2 Lenses
FIG. 2.5—Two Lens Ring in Use
FIG. 2.6—Two Lens Barrel-Loop in Use
FIG. 2.7—Transverse Section of The Optical Barrel
FIG. 2.8—Cross Section of The Optical Barrel
FIG. 3.0—Cross Section of the Profile View of the Ring with 1 Shifted Lens
FIG. 3.1—Side View of Ring With 1 Shifted Lens
FIG. 3.2—Profile View of the Ring with 1 Shifted Lens
FIG. 3.3—Top View of the Ring with 1 Shifted Lens
FIG. 3.4—Lens Held During Use
FIG. 3.5—Shifted Lens Worn as Fashion Item
FIG. 4.0—Cross Section of the Profile View of the Ring with 1 Shifted Lens
FIG. 4.1—Side View of Ring With 1 Shifted Lens
FIG. 4.2—Profile View of the Ring with 1 Shifted Lens
FIG. 4.3—Top View of the Ring with 1 Shifted Lens
FIG. 5.0—Cross Section of the Profile View of the Ring with 1 Partially Shifted Lens copy
FIG. 5.1—Side View of Ring With 1 Partially Shifted Lens
FIG. 5.2—Profile View of the Ring with 1 Partially Shifted Lens
FIG. 5.3—Top View of the Ring with 1 Partially Shifted Lens
FIG. 5.4—Bottom View of the Ring with 1 Partially Shifted Lens
FIG. 5.5—Perspective View of the Ring with 1 Partially Shifted Lens
FIG. 5.6—One Partially Shifted Lens Worn as Fashion Item
FIG. 6.0—Cross Section of the Profile View of the Ring with 1 Partially Shifted Lens copy
FIG. 6.1—Side View of Ring With 1 Partially Shifted Lens
FIG. 6.2—Profile View of the Ring with 1 Partially Shifted Lens
FIG. 6.3—Bottom View of the Ring with 1 Partially Shifted Lens
FIG. 7.0—Side View of Ring with 3 Lenses
FIG. 8.0—Side View of Ring with 4 Lenses

DETAILED DESCRIPTION OF THE DRAWINGS

Referring to FIG. 1.0 we show a cross section of a visual aid that consists of a frame (4), the frame being circular or square in shape, the frame is adapted for mounting a lens (1). The lens (1) has a specific optical power that is rigidly attached to the frame (4). Unlike other existing art, both the frame (4) and the lens (1) conform to the edge or circumference (14) of the ring (2) or specifically, conformal to the outer surface (13) of the ring (2). The ring (2) is generally cylindrical in shape and has a longitudinal axis (not shown) defined therein. The ring (2) has a main plane (10) that is normal to the longitudinal axis of the ring (cylinder) (2) and may parallel to the edge or circumference (14) of the ring (2). The main plane (10) may be centrally located on the ring (2), or the main plane (10) may be positioned at any position along the longitudinal axis of the ring (cylinder) (2) providing a normal plane to the longitudinal axis. There is a bridge (5) that maintains structural stability of the frame (4). The bridge (5) is attached to the ring (2) and the frame (4) is attached to the bridge (2) making a one-piece structure. The lens (1) has an optical axis, where the optical axis (11) of the lens (1) is positioned on the main plane (10) of the ring (cylinder) (2). In the same location on the ring (2) where the frame (4) and lens (1) are installed, there is a first gap (6) in the ring (2). This first gap (6) in the ring (2) is intended to facilitate optical rays or light to travel freely from one side of the lens (1) frame (4) structure to the opposing side of the lens (1) frame (4) structure. A finger hole (3) of the ring (2) is located generally along the longitudinal axis (not shown) of the ring (2). The finger hole (3) of the ring (2) is generally circumferential in shape as is the ring (2) so as to conform to a users finger. On the side opposing the first gap (6) in the ring (2) a second gap (9) is provided. The second gap (9) also intended to facilitate optical rays or light to travel from the finger hole (3) of the ring (2) to the outside of the ring (2). The first gap (6) and the second gap (9) are strategically located across from each other thereby enabling the user to look through the ring (2) and its useful optical element, the lens (1). The user is able to wear the ring (2) for long periods of time by inserting his or her finger in the finger hole (3) of the ring (2). Whenever the user is ready to use the visual aid shown in figure one, he or she can remove the ring (2) from his/her finger and place the device close to his or her eye to enjoy its optical benefits. Unlike the current invention where the optical rays travel through the ring (2), all other ring-attached lenses described by the prior art are intended to view optically enhanced images via the exterior space of the ring. When the main plane (10) is positioned between the edges (14) of the ring (2), a first gap (6) and second gap (9) will be required. When the main plane (10) is positioned beyond the edges (14) of the ring (2) a first gap (6) and second gap (9) will not be necessary.

FIG. 1.1 shows a side view of the visual aid showing both the top frame (4) containing the one lens (1) and a second frame (8) that does not contain a lens on the other side of the ring (2). The second frame (8) may be circular or square in shape. The second frame (8) acts as a window gap (9) through which the optical rays travel in and out of the finger hole (3) of the ring (2). Just like the first frame (4), the second frame (8) is rigidly attached to the ring (2). This figure illustrates, the main plane of the ring (10) in cross section onto which the optical axis (11) of the one lens (1) resides.

FIG. 1.2 shows a profile or edge view of the ring-shaped visual aid showing both the top frame (4) containing the lens (1) and the second frame (8) that does not contain a lens on the opposing side of the ring (2). Such second frame acts as a window gap (9) through which the optical rays travel in and out of the hole of the ring (2). Just like the first frame (4), the second frame (8) is rigidly attached to the ring (2). This figure also illustrates, in cross section, the main plane of the ring (10) onto which the optical axis (11) of the one lens (1) resides. This shows that the main plane (10) of the ring (2) is parallel to the edges or circumference (14) of the ring (2) and is located in the middle of the ring (2) FIG. 1.3 shows the top view of the visual aid showing both the top frame (4) containing the lens (1) and the second frame (8) that does not contain a lens on the opposing side of the ring (2). Of note is that the second frame (8) is visible through the top frame (4) containing the lens (1). Also of note is that in this view the outer surface of the ring (13) is visible through the lens (1) as is the edge or circumference (14) of the ring (2). When the user of the visual aid looks through the one lens (1) from the top as shown in this FIG. 1.3, he or she will see the world that is on the other side of the ring (2) through the second gap (9) on the opposing side of the ring (2). Such novelty in the current invention is not provided in any of the current available prior art. Without the second gap (9) on the opposite side of the lens, the user cannot view the world through the ring. The second gap (9) is the window through which the optical rays or light travel in and out of the hole of the ring (2).

FIG. 1.4 shows a bottom view of the ring (2). In this view the bottom frame (8) of the visual aid is clearly seen in the center. The bottom frame (8) shows the second gap (9) in the middle. The user of the visual aid can simultaneously look into the second gap (9), through the inside of the ring (3) and the center of the lens (1) located in the top frame (4) which is positioned opposite the lower frame (8) on the opposing side of the ring (2). These physical window gaps (first gap (6) and second gap (9)) are contained in the top and bottom frames (4 and 8) respectively and provides a clear path for the optical rays traveling in and out of the ring (2). This allows the user to enjoy an unobstructed and optically enhanced view through the ring (2). Such novelty is not available in ring-attached lenses in existing art. FIG. 1.5 shows a one lens ring representing the current invention worn as a fashion item.

The ring worn on the finger in FIG. 1.5 can be removed by the user and brought close to his or her eye and therefore be of use as a visual aid as illustrated in FIG. 1.6. FIG. 1/6 shows the user is holding the ring (2) using the thumb and index fingers, and placing the lens (1) in close proximity to his or her eye. The user is then able to look through lens (1) and the body of the ring (2) because the ring has an optical (second) gap (9) on the opposite side of the lens (1). The second gap (9) is acting as an open window. The optical axis (11) of the lens (1) is positioned in a way to travel through the middle of such optical (second) gap (9). The second gap (9) is mechanically supported by a frame (8).

Referring to FIG. 2.0, we show the addition of a lens (7) to the disclosure of FIGS. 1.0 to 1.5.

As described in FIGS. 1.0 through 1.5, we now show FIG. 2.0 which shows the cross section of the visual aid and consists of the frame (4), which is circular or square in shape, the frame is adapted for mounting the lens (1). The disclosed lens (1) has a specific optical power that is rigidly attached to the frame (4). Unlike other existing prior art, both the frame (4) and the lens (1) conform to the edge or circumference (14) of the ring (2) or specifically, conformal to the outer surface (13) of the ring (2). The ring (2) is generally cylindrical in shape and has a longitudinal axis (not shown) defined therein. The ring (2) has a main plane (10) that is normal to the longitudinal axis of the ring (cylinder) (2) and may be parallel to the edge or circumference (14) of the ring (2). The main plane (10) may be centrally located on the ring (2), or the main plane (10) may be positioned at any position along the longitudinal axis of the ring (cylinder) (2) defining a normal plane to the longitudinal axis. The bridge (5) maintains structural stability of the frame (4). The bridge (5) is attached to the ring (2) and the frame (4) is attached to the bridge (2) making a one-piece structure. As disclosed previously, the lens (1) has an optical axis (11), where, the optical axis (11) of the lens (1) is on the main plane (10) of the ring (2). In the same location on the ring (2) where the frame (4) and lens (1) are installed, there is a first gap (6) in the ring (2). This first gap (6) in the ring (2) is intended to facilitate optical rays or light to travel freely from one side of the lens (1) and frame (4) structure to the opposing side of the lens (1) and frame (4) structure where the finger hole (3) of the ring (2) is located. The finger hole (3) of the ring is generally circumferential in shape as is the ring (2) so as to conform to a user's finger. On the side opposing the first gap (6) in the ring (2) a second gap (9) is provided. The second gap (9) also intended to facilitate optical rays or light to travel from the finger hole (3) of the ring (2) to the outside of the ring (2). The first gap (6) and the second gap (9) are strategically located across from each other thereby enabling the user to look through the ring (2) and its useful optical element, the lens (1).

The user is able to wear the ring (2) for long periods of time by inserting his/her finger in the finger hole (3) of the ring (2). Whenever the user is ready to use the visual aid shown in FIG. 2.5, he or she can remove the ring (2) from his/her finger and place the device close to his/her eye to enjoy its optical benefits. Unlike the current invention where the optical rays travel through the ring (2), all other ring-attached lenses described by the prior art are intended to view optically enhanced images via the exterior space of the ring. The second frame (8) is shown attached to the ring (2) positioned over the second gap (9). The second frame (8) may be circular or square in shape to match the first frame (4). The second lens (7) is fixed in the second frame (8). The second lens (7) has a second optical axis (12) where the second optical axis (12) is aligned with the first optical axis (11) of the first lens (1). Both the first and second optical axis (11, 12) lie on the main plane (10) of the ring (2)

FIG. 2.1 shows a side view of the visual aid showing both the first frame (4) containing the first lens (1) and the second frame (8) containing the second lens (8) on the opposing side of the ring (2). The second frame (8) as previously described, also acts as a window gap (9) through which the optical rays travel in and out of the finger hole (3) of the ring (2). Just like the first frame (4), the second frame (8) is rigidly attached to the ring (2). This figure illustrates, the main plane of the ring (10) in cross section onto which the first and second optical axis (11, 12) of the first lens (1) and second lens (2) reside.

FIG. 2.2 shows a profile or edge view of the ring-shaped visual aid showing both the first frame (4) containing the first lens (1) and the second frame (8) that contains the second lens (8) which is positioned on the opposite side of the ring (2). The second frame also acts as a window by providing a gap (9) through which optical rays travel in and out of the finger hole (3) of the ring (2). Just like the first frame (4), the second frame (8) is rigidly attached to the ring (2). This figure also illustrates, in cross section, the main plane of the ring (10) onto which the first and second optical axis (11, 12) of the first lens (1) and second lens (2) reside. The edge view of FIG. 2.2 shows that the main plane (10) of the ring (2) is parallel to the edges or circumference (14) of the ring (2) and is located in the middle of the ring (2), but the location of the main plane (10) of the ring (2) need not be located between the edges (14) of the ring (2). As will be seen in later figures, the main plane (10) may be located beyond the edge (14) of the ring (2).

FIG. 2.3 shows the top view of the visual aid showing both the first frame (4) containing the first lens (1) and the second frame (8) that contains the second lens (8) and is positioned on the opposing side of the ring (2). Of note is that the second frame (8) is visible through the first frame (4) containing the first lens (1). Also of note is that in this view the outer surface of the ring (13) is visible through the lens (1) as is the edge or circumference (14) of the ring (2). When the user of the visual aid looks through the first and second lens (1, 8) from the top as shown in this FIG. 1.3, he or she will see the world that is on the other side of the ring (2) through the second gap (9) on the opposing side of the ring (2). Such novelty in the current invention is not provided in any of the current available prior art. Viewing through the first lens (7) then the second lens (8) provides a greater level of acuity and magnification than the single lens system.

There are many utility benefits to using multiple lenses. Such combinations are already in wide use in existing prior art. An example of this would be the 2-lens loop magnifier used by jewelers. What distinguishes the current invention is the placement and simultaneous use of the 2 lenses (1, 7) while placed along the circumference (14) of the ring (2) as shown in FIG. 2.5 as opposed to the 2 lenses (22) being inside an optical barrel (18) as shown in FIG. 2.6.

FIG. 2.4 shows a bottom view of the ring (2). In this view the second frame (8) of the visual aid is clearly seen in the center. The second frame (8) which contains the second lens (7) shows the second gap (9) in the middle. The user of the visual aid can simultaneously look into the second gap (9), and the center of the second lens (8) through the inside of the ring (3) and the center of the first lens (1) located in the which is positioned opposite the lower frame (8) on the opposing side of the ring (2). These physical window gaps (first gap (6) and second gap (9)) are contained in the top and bottom frames (4 and 8) respectively and provides a clear path for optical rays traveling in and out of the ring (2). This allows the user to enjoy an unobstructed and optically enhanced view through the ring (2). Such novelty is not available in ring-attached lenses in existing art. FIG. 1.5 shows a one lens ring representing the current invention worn as a fashion item.

The ring may be worn on the finger and then can be removed by the user and brought close to his or her eye and therefore be of use as a visual aid as illustrated in FIG. 2.5. FIG. 2.5 shows the user is holding the ring (2) using the thumb and index fingers, and placing the lens (1) in close proximity to his or her eye. The user is then able to look through the first and second lens (1, 7) and the body of the ring (2) because the ring has an optical (second) gap (9) on the opposite side of the lens (1). The second gap (9) is acting as an open window. The optical axis (11) of the lens (1) is positioned in a way to travel through the middle of such optical (second) gap (9). The second gap (9) is mechanically supported by a frame (8).

FIG. 2.5 illustrates the simultaneous use of two lenses (1, 7) located opposite each other along the circumference (14) of the ring (2). Note that the first and second optical axis (11, 12) of the two lenses (1, 7) (not shown) are located on the cross-sectional plane (10) of the ring (2). This is in contrast to existing art as shown in FIG. 2.6 where the use of the widely popular loop is illustrated. FIG. 2.6 shows the optical axis (23) of the two lenses (22) placed in an optical barrel of a loop (18) to be perpendicular to the cross-sectional plane (21) of the cylinder of the loop optical barrel (18).

This 90° shift in alignment of the optical axis in the current invention as compared to the existing use is also illustrated in FIG. 2.7 where in the transverse section of a loop representing the existing art, the optical axis (23) of the lenses (22) of the loop are parallel to the transverse section of the optical barrel (18), while the optical axis (11) of the lens (1) of the current invention is perpendicular to the transverse section of the optical ring (2).

FIG. 2.8 further elaborates on this 90° shift via a cross sectional approach of both existing use and the current invention. Whereas the optical axis (23) of the lens (22) is perpendicular to the cross section of an optical barrel (18) in current use, the optical axis (11) of the lenses (1, 7) is parallel and on the same plane of the cross section of the optical ring (2) in the current invention.

Such departure in the structure of the handle of the visual aid as well as the orientation of the attached lenses allows for a novel utility not possible or available in current use. The optical ring (2) as a handle allows for the user to wear the visual aid on his or her finger, as well as having the ability to incorporate multiple lenses simultaneously.

Referring to FIG. 3.0, we show the optical axis (10) as disclosed in FIG. 1.0 through 1.6 and FIGS. 2.0 through 2 located beyond the edge (14) of the ring (2). FIG. 3.0 shows a cross section of the visual aid that consists of the frame (4) that is adapted for mounting the first lens (1). The frame (4) may be circular with a diameter or square with a width in shape. The lens (1) has a specific optical power and is rigidly attached to the frame (4). The frame (4) shown in FIG. 3.0, has been shifted the full diameter or width of the frame (4) to mount on the edge or circumference (14) of the ring (2). Unlike other existing art, both the frame (4) and the lens (1) conform to the edge or circumference (14) of the ring (2). The ring (2) has a main plane (10) that is normal to the longitudinal axis of the ring (cylinder) (2) and may parallel to the edge or circumference (14) of the ring (2). The main plane (10) is shown shifted away from the edge or circumference (14) of the ring (2), along the longitudinal axis of the ring (cylinder) (2) providing a normal plane to the longitudinal axis. The first lens (1) has an first optical axis (11), where, the first optical axis (11) of the first lens (1) is located on the main plane (10) of the ring (2). A finger hole (3) of the ring is generally circumferential in shape as is the ring (2) so as to conform to a users finger. The user is able to wear the ring (2) for long periods of time by inserting his/her finger in the finger hole (3) of the ring (2).

Whenever the user is ready to use the visual aid shown in FIGS. 3.0 through 3.5, he or she can remove the ring (2) from his/her finger and place the device close to his or her eye to enjoy its optical benefits. Unlike the current invention where the optical rays travel through the ring (2), all other ring-attached lenses described by the prior art are intended to view optically enhanced images via the exterior space of the ring. The description for FIGS. 3.0 through 3.5 allows optical images to travel through the ring (2) without the necessity for creating an optical gap (FIGS. 1.0-1.9) as is the case in embodiment described previously.

FIG. 3.1 represents the side view of the ring (2) with the first lens (1) anchored in the first frame (4) attached to the edge (14) of the ring (2). The shifting of the first frame (4) and first lens (1) which is attached to the edge of circumference (14) of the ring (2) as shown in this view is not readily apparent. What is readily apparent is the absence of any optical gaps on the side of the ring (2) as described previously. Such optical gaps are present in the side view of the FIGS. 1.0 through 1.9 and FIGS. 2.0 through 2.8, but are not required here. Whereas the functionality of the one lens is the same for the user in both embodiments, having a full and uninterrupted ring as shown in FIGS. 3.0 through 3.5 provides for a cosmetic appeal that is different than what has been described in FIGS. 1.0 through 1.9 and FIGS. 2.0 through 2.8.

FIG. 3.2 clearly shows the position of the fully shifted first frame (4) which is fixedly attached to the side of the ring (2) showing the first lens (1) which is attached into the frame (4). The optical axis (11) of the lens (1) still lies within the main plane (10) of the ring (2) while maintaining a parallel relationship to the main plane (10) of the ring (2). Since the main plane (10) is normal to the longitudinal axis (not shown) of the ring (cylinder) (2) the positional shifting away from the edge or circumference (14) of the ring (2) is noteworthy. Also, note that the lens (1) remains conformant to the circumference of the ring (2).

FIG. 3.3 also clearly shows the shifted first frame (4), which is fixedly attached to the edge or circumference (14) of the ring (2) and is showing the first lens (1) is embedded to the shifted first frame (4). The first optical axis (11) of the first lens (1) is shown shifted away from the center of the ring (2) while maintaining a parallel relationship to the main plane (10) of the ring (2). The full shift as disclosed is the full diameter or width of the fully shifted frame (4). Also note that the lens (1) remains conformant to the circumference or edge (14) of the ring (2).

In the current invention as shown in FIG. 3.5, the ring (2) is worn on the users finger and can be removed by the user and brought close to his or her eye and used as a visual aid as illustrated in FIG. 3.4. The user is holding the ring (2) using the thumb and index fingers, and placing the first lens (1) next to the eye. The user is able to look through the first lens (1) without interference by the body of the ring (2) because the first lens (1) is not obstructed by the body the ring (2).

Referring to FIG. 4.0, we clarify the location of the main plane (10) along a longitudinal axis (not shown) to show what occurs when the main plane (10) is not central to the cross section of the ring (2). FIG. 4.0 shows a cross section of the visual aid that consists of the first frame (4), where the first frame (4) is adapted for mounting a first lens (1) along the edge or circumference (14) of the ring (2). The first lens (1) has a specific optical power that is rigidly attached to the first frame (4). As also shown in FIGS. 3.0 through 3.5, both the first frame (4) and the first lens (1) conform to the edge or circumference (14) of the ring (2). The ring (2) has a main plane (10) that is normal to the longitudinal axis (not shown) of the ring (cylinder) (2) and may be parallel to the edge or circumference (14) of the ring (2). The main plane (10) may be centrally located on the ring (2), or as FIGS. 4.0 through 4.3 show, the main plane (10) may be positioned at any location along the longitudinal axis of the ring (cylinder) (2) and shown in FIG. 4.0 through 4.3 parallel to the edge or circumference (14) of the ring (2), but positioned away from the edge or circumference (14) of the ring (2). The first lens (1) has a first optical axis, where, the first optical axis (11) of the first lens (1) is positioned off the edge or circumference (14) of the ring (2). A finger hole (3) of the ring is generally circumferential in shape as is the ring (2). The second frame (7) is added opposing the first frame (4). The second lens (7) is fixedly attached to the second frame (8). The second lens (7) has a second optical axis (12) where the second optical axis (12) is aligned with the first optical axis (12) and both being parallel and lying on the main plane (10) of the ring (2). It must be noticed that even though the first and second frames (4 and 8) and the first and second embedded lenses (1 and 7) are shifted away from the center of the ring (2) and attached to the edge or circumference (14) of the ring (2), they are still parallel to the main plane (10) and aligned to each other. This 2-lens alignment will allow the ring (2) to provide the utility benefits of using multiple lenses.

The user is able to wear the ring (2) for long periods of time by inserting his or her finger in the finger hole (3) of the ring (2). Whenever the user is ready to use the visual aid shown in FIG. 4.0 through 4.3, he or she can remove the ring (2) from his or her finger and place the ring-shaped visual aid close to his or her eye to enjoy its optical benefits. Unlike the current invention where the optical rays travel through the ring (2), all other ring-attached lenses described by the prior art are intended to view optically enhanced images via the exterior space of the ring. The description described by FIGS. 4.0 through 4.3 allows optical images to travel through the ring (2) without the necessity for creating an optical gap as described in FIGS. 1.0 through 1.9 and FIGS. 2.0 through 2.8.

FIG. 4.1 represents the side view of the ring (2) with the first lens (1) anchored in the first frame (4) of the and the second lens (7) anchored in the second frame (8) of the ring (2). The location of the first and second frame (4, 8), is located along the edge or circumference (14) of the ring (2).

The first and second optical axis (11, 12) of the first and second lens (1, 7) are aligned to each other and lie within the main plane (10) which is normal to the longitudinal axis (not shown) of the ring (2). What is apparent in the invention is that there is an absence of any gaps on the side of the ring (2) as described previously. Such optical gaps are present in the side view ring (2) as shown in FIGS. 1.0-1.9 and FIGS. 2.0 through 2.8. Whereas the functionality of the one lens is the same for the user in both embodiments, having a full and uninterrupted ring in description provides for a cosmetic appeal that is different than the first embodiment.

FIG. 4.2 clearly shows the position of the shifted first and second frame (4, 8) which is fixedly attached to the edge or circumference (14) of the ring (2) showing the first and second lens (1, 7) attached into the shifted frames (4, 8). The first and second optical axis (11, 12) of the first and second lens (1, 7) is shown shifted a distance away from the center of the ring, but still located on the main plane (10) of the ring (2) while still maintaining a parallel relationship to the main plane (10) of the ring (2). Also, note that the first and second lens (1, 7) remains conformant to the circumference of the ring (2).

FIG. 4.3 also clearly shows the first and second shifted frame (4, 8), which is fixedly attached to the side of the ring (2) showing the first and second lens (1, 7) embedded to the first and second shifted frame (4, 8). The first and second optical axis (11, 12) of the first and second lens (1, 7) is shown shifted away from the center of the ring (2) while maintaining a parallel relationship to the main plane (10) of the ring (2). Also note that the first and second lens (1, 7) remains conformant to the circumference or edge (14) of the ring (2).

FIG. 5.0 represents the cross section of the profile of a third embodiment of the current invention. The difference here is that the optical axis (11) of the one lens (1) is partially shifted away from the band while remaining parallel to the main plane (10) of the ring (2). The lens (1) remains conformant to the circumference (14) of the ring (2). This embodiment allows optical images to travel through the ring (2) by creating a partial optical gap (17) that removes a portion of the ring (2). Such a partial gap (17) is more clearly demonstrated in FIGS. 5.1 and 5.2.

FIG. 5.1 represents the side view of the ring (2) with the lens (1) anchored in the shifted frame (4) of the second embodiment. The shifting of the frame (4) and lens (1) in this view does not show as well as FIGS. 5.2 and 5.3. What is clear is the location of the ring (2) partial gap (17) on the side that is opposite from the lens (1). Whereas, the functionality of the one lens (1) is the same for the user in the other described embodiments, having a full and uninterrupted ring in this third embodiment provides for a cosmetic appeal seen in FIGS. 5.5 and 5.6 that is different than the other embodiments.

FIG. 5.2 of the third embodiment clearly shows the partially shifted frame (4) to the side of the ring (2) with the lens (1) embedded in it. The optical axis (11) of the one lens (1) is partially shifted away from the band while remaining parallel to the main plane (10) of the ring (2). Also, the lens (1) remains conformant to the circumference (14) of the ring (2).

FIG. 5.3 of the third embodiment also clearly shows the partially shifted frame (4) to the side of the ring (2) with the lens (1) embedded in it. The optical axis (11) (not shown) of the one lens (1) is shifted away from the band while remaining parallel to the main plane (10) of the ring (2). Also, the lens (1) remains conformant to the circumference (14) of the ring (2). In this FIG. 5.3, the partial gap (17) is illustrated by a hidden line which represents the outer edges of the partial gap (17). The partial gap (17) provides clearance so images may travel through the partially shifted lens (1) and allow for the important 2-lenses utility. Such coordination between the partially shifted lens (1) and the partial gap (17) is clearly illustrated in FIG. 5.4 representing a view of the bottom side of the ring.

In the third embodiment of the current invention, the ring (2) is shown in a perspective view in FIG. 5.5 and also shown worn on the finger in FIG. 5.6. The ring can be removed by the user to be brought close to his/her eye for use as a visual aid. The user can hold the ring (2) using the thumb and index fingers, and place the lens (1) next to the eye. The user is then able to look through lens (1) without interference by the body of the ring (2) because the lens (1) is partially shifted away from the ring (2) and the opposite side of the ring has a gap (17) that is large enough to accommodate a full view through the lens (1) without interruption Using the same third embodiment of the visual aid where the lens is partially shifted the same way as described in FIGS. 5.0, 5.1, 5.2, 5.3, and 5.4.

In this fourth embodiment shown in FIG. 6.0 one can add a frame (8) with a second lens (7) on the opposing side of the existing frame (4) and lens (1), which is illustrated in FIGS. 6.0 (side view cross section), 6.1 (side view), 6.2 (profile view), and 6.3 (top view). Such figures have the same description as FIGS. 5.0, 5.1, 5.2, 5.3, and 5.4 except for the addition of a second frame (8) containing a second lens (7) with a second optical axis (12) that is also partially shifted away from the ring (2) as shown in FIGS. 6.0, 6.1, 6.2 and 6.3. Notice that even though both frames (4 and 8) and the two embedded lenses (1 and 7) are partially shifted away from the ring they are parallel and aligned along the circumference (14) of the ring as it is clarified in FIGS. 6.0, 6.1, 6.2 and 6.3. Also of note, the optical axes of the two lenses (11, 12) are still aligned. This 2-lens alignment will allow the fourth embodiment to provide the utility benefits of using multiple lenses.

Another set of embodiments of the current invention is the use of more than 2 lenses based on the same principles described above. One example of such embodiment contains 3 lenses that are anchored on a frame that is fixed and conformed to the circumference (14) of a ring (2). FIG. 7.0 illustrates the use of 3 lenses (1, 24 and 26) on 3 frames (4, 25 and 27) that are attached to the circumference (14) of a ring (2). The optical axes (32 and 33) travel in and out of the ring (2) without interruption. Such axes are parallel to the cross-sectional plane (10) of the ring (2). The triple lens design, allows for two optical powers to be used. Users can benefit from double the utility value, such as near, magnified, intermediate or distant focus. Unlike current art the optical axes of the lenses in this embodiment are tilted; as such optical quality is not optimal.

Another example of the multiple lenses embodiment contains 4 lenses that are anchored opposite each other on frames that is fixed and conformed to the circumference of a ring. FIG. 8.0 illustrates the use of 4 lenses (1, 28, 30 and 36) on 4 frames (4, 29, 31 and 37) that are attached to the circumference of a ring (2). The 4 optical axes (34, 35, 40 and 41) travel in and out of the ring (2) without interruption. All axes are parallel to the cross-sectional plane (10) of the ring (2). The quadruple lens design, allows for 4 optical powers to be used. Two of the optical powers are generated through parallel lenses and two through tilted lenses. Users can benefit from quadruple the utility value, such as near, magnified, intermediate or distant focus. Unlike current art the optical axes of the lenses in this embodiment are tilted; as such optical quality is not optimal.

What is claimed is:

1. A ring-shaped visual aid, comprising:
a ring, the ring having a finger hole defined therein, a frame, the frame being attached to the ring by a bridge, the frame having a first gap defined therein, a lens is positionally held by the frame, the lens being rigidly attached to the ring positioned in the first gap in the frame;
the ring and the frame are circumferentially shaped to conform to the ring;
the bridge structurally stabilizes the frame, and is located between the frame and the ring;
the ring has a main plane defined therethrough, the main plane being centrally positioned to the ring;
the lens has an optical axis, the optical axis of the lens is positioned on the main plane of the ring;
the ring has a first gap defined therein, the first gap being located where the frame and lens are attached;
the ring has a second gap defined therein, the second gap is positioned opposing the first gap in the ring,
the first gap allows optical rays to travel freely from one side of the lens and frame to the opposing side of ring where the second gap in the ring is located;
the second gap allows optical rays to travel from the hole in the ring to the outside of the ring; and
the first gap in the frame and the second gap in the ring are positioned opposing each other allowing the user to look through the ring and its lens.

2. The ring-shaped visual aid of claim 1, further comprising a second frame, the second frame being fixedly attached to the ring and being centrally located on the second gap providing a clear line-of-sight therethrough.

3. The ring-shaped visual aid of claim 2, further comprising a second lens, the second lens is fixedly attached to the second frame, the second lens has a second optical axis, the optical axis of the first lens and second lens are aligned and lie on the main plane of the ring.

4. A ring-shaped visual aid, comprising:
a ring, the ring having a cylindrical shape and having a finger hole defined therein;
the ring further having longitudinal axis, a main plane, the main plane being normal to the longitudinal axis;
the main plane being positioned along the longitudinal axis of the ring, the ring having a first frame, the first frame is attached to the ring at a circumferential edge, the first frame has a first gap or window defined therein, a first lens is positionally held by the first frame, the first lens being rigidly attached to the ring;
the ring and the first frame are circumferentially shaped to conform to the ring; and
the first lens has a first optical axis, the first optical axis of the first lens is parallel to and positioned in the main plane of the ring.

5. The ring-shaped visual aid of claim 4, further comprising a second frame, the second frame being attached to the ring at a circumferential edge, the second frame has a second gap defined therein;
a second lens, the second lens being positionally held by the second frame;
the ring and the second frame are circumferentially shaped to conform to the ring; and
the second lens has a second optical axis, the second optical axis is aligned with the first optical axis of the first lens, both the first and second optical axis being parallel to and positioned in the main plane of the ring.

6. A ring-shaped visual aid, comprising:
a ring, the ring having a cylindrical shape and having a finger hole define therein;
the ring further having an edge or circumference defined therein;
the ring further having a longitudinal axis and a main plane defined therein, the main plane being positioned on the longitudinal axis and being normal to the longitudinal axis;
a first frame, the first frame having a window defined therein, a first lens, the first lens having a first optical axis defined therein, the first lens is fixedly attached to the first frame;
the first optical axis being positioned on the main plane;
the first frame being attached to the ring;
the first frame is circumferentially shaped to conform to the ring; and
a first gap, the first gap aligning with the first frame window allowing light to pass therethrough to the finger hole.

7. The ring-shaped visual aid of claim 6, further comprising a bridge, the bridge stabilizing the frame to the ring.

8. The ring-shaped visual aid of claim 6, further comprising a second frame;
the second frame being attached to the ring opposite the first frame;
the second frame is circumferentially shaped to conform to the ring; and
a second gap, the second gap allowing light to pass through from the finger hole through the second gap and second frame.

9. The ring-shaped visual aid of claim 8 further comprising a second lens, the second lens having a second optical axis, the second optical axis being aligned with the first optical axis and both the first optical axis and second optical axis being positioned on the main plane;
the second lens being fixedly attached to the second frame allowing light to pass through.

10. The ring-shaped visual aid of claim 9 wherein the first and second frames are attached to the edge or circumference of the rings.

11. The ring-shaped visual aid of claim 6 wherein the main plane of the ring is centrally located on the ring.

* * * * *